(12) United States Patent
Vasyltsov et al.

(10) Patent No.: US 8,527,567 B2
(45) Date of Patent: Sep. 3, 2013

(54) RANDOM NUMBER GENERATORS HAVING METASTABLE SEED SIGNAL GENERATORS THEREIN

(75) Inventors: Ihor Vasyltsov, Gyeonggi-do (KR); Bohdan Karpinskyy, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 527 days.

(21) Appl. No.: 12/895,078

(22) Filed: Sep. 30, 2010

(65) Prior Publication Data

US 2011/0131263 A1 Jun. 2, 2011

(30) Foreign Application Priority Data

Nov. 30, 2009 (KR) .................. 10-2009-0116500

(51) Int. Cl.
*G06F 7/58* (2006.01)

(52) U.S. Cl.
USPC ........................................ 708/250

(58) Field of Classification Search
None
See application file for complete search history.

(56) References Cited

U.S. PATENT DOCUMENTS

| 7,424,500 | B2 * | 9/2008 | Fukushima et al. | 708/251 |
|---|---|---|---|---|
| 8,250,128 | B2 * | 8/2012 | Vasyltsov et al. | 708/250 |
| 8,260,835 | B2 * | 9/2012 | Fukushima et al. | 708/251 |
| 8,285,767 | B2 * | 10/2012 | Chandra | 708/251 |
| 8,341,201 | B2 * | 12/2012 | Vasyltsov et al. | 708/251 |
| 2004/0017235 | A1 * | 1/2004 | Hars | 327/164 |
| 2004/0264233 | A1 * | 12/2004 | Fukushima et al. | 365/145 |
| 2008/0313249 | A1 * | 12/2008 | Fukushima et al. | 708/251 |
| 2009/0106339 | A1 * | 4/2009 | Vasyltsov et al. | 708/251 |
| 2010/0201419 | A1 * | 8/2010 | Vasyltsov et al. | 327/164 |
| 2010/0211624 | A1 * | 8/2010 | Dichtl | 708/251 |
| 2010/0332574 | A1 * | 12/2010 | Herbert et al. | 708/251 |
| 2011/0131263 | A1 * | 6/2011 | Vasyltsov et al. | 708/251 |
| 2011/0302232 | A1 * | 12/2011 | Vasyltsov et al. | 708/251 |
| 2012/0233231 | A1 * | 9/2012 | Vasyltsov et al. | 708/250 |
| 2012/0303690 | A1 * | 11/2012 | Fukushima et al. | 708/251 |

FOREIGN PATENT DOCUMENTS

| JP | 2007-034836 | 2/2007 |
|---|---|---|
| JP | 2008-097610 | 4/2008 |
| KR | 1020020089985 A | 11/2002 |
| KR | 100659182 B1 | 12/2006 |

\* cited by examiner

*Primary Examiner* — David H Malzahn
(74) *Attorney, Agent, or Firm* — Myers Bigel Sibley & Sajovec, P.A.

(57) ABSTRACT

A random number generator includes a signal generator and a sampling unit. The signal generator is configured to generate an alternating sequence of metastable seed signals and oscillating signals during respective first and second half-periods of a clock signal. The oscillating signals having respective phases determined by corresponding ones of the metastable seed signals in the alternating sequence. The sampling unit is configured to detect a logic value of each consecutive oscillating signal during a portion of a respective half-period of the clock signal. The signal generator may be responsive to the clock signal and the sampling unit may be responsive to a delayed version of the clock signal.

20 Claims, 25 Drawing Sheets

RANDOM NUMBER GENERATORS HAVING METASTABLE SEED SIGNAL GENERATORS THEREIN

REFERENCE TO PRIORITY APPLICATION

This application claims priority to Korean Patent Application No. 10-2009-0116560, filed Nov. 30, 2009, the contents of which are hereby incorporated herein by reference.

FIELD OF THE INVENTION

This invention relates to security devices and, more particularly, to random number generators used in security devices.

BACKGROUND

As information- and communication-based technologies have developed, encryption and decryption have become important ways to protect confidentiality of information. Random numbers are used in many applications including the generation of secret keys for security systems. Accordingly, systems in which security is important frequently use random number generators. Random number generators necessarily generate unpredictable random numbers.

In systems in which security is important, random numbers are not permitted to have periodicity or be regular. In more detail, security systems need to generate perfect random numbers that are unpredictable and have no periodicity. True random numbers (TRNs) generated from physical noise sources are unpredictable and have no periodicity.

In order to generate TRNs, conventional random number generators have used thermal noise or shot noise as a noise source. Alternatively, conventional random number generators have generated clock signals having irregular periods using ring oscillators. However, conventional random number generators have performance degraded due to mismatches based on various reasons.

SUMMARY

Integrated circuit devices according to embodiments of the invention include random number generators. According to some of these embodiments of the invention, a random number generator includes a signal generator, which is responsive to a first clock signal. The signal generator is configured to generate an oscillating signal having a peak-to-peak voltage that varies as a function of time during at least a portion of a second half-period of the first clock signal. The signal generator is also configured to generate a metastable seed signal during a first half-period of the first clock signal. This metastable seed signal has a voltage that designates a starting value of the oscillating signal during the second half-period of the first clock signal.

According to additional embodiments of the invention, the random number generator further includes a sampling unit, which is configured to detect a logic value of the oscillating signal in-sync with a second clock signal that is out-of-phase relative to the first clock signal. In particular, the sampling unit may include a latch having a data input responsive to the oscillating signal and a sync input responsive to the second clock signal. The random number generator may also include a first delay unit, which is configured to generate the second clock signal in response to the first clock signal.

According to further embodiments of the invention, the signal generator may operate as a ring oscillator during the second half-period of the first clock signal. In addition, the signal generator may be configured to generate the metastable seed signal using an inverting logic circuit having an input and an output electrically connected together. The signal generator may also include a second delay unit, which has an input electrically coupled to the output of the inverting logic circuit, and a switching device having a first input electrically coupled to an output of the second delay unit and a second input electrically coupled to the output of the inverting logic circuit. In some of these embodiments of the invention, the inverting logic circuit may be configured as a conventional inverter and the switching device may be configured as a multiplexer having a control terminal responsive to the first clock signal.

According to still further embodiments of the invention, a random number generator may be provided with a signal generator and a sampling unit. The signal generator is configured to generate an alternating sequence of metastable seed signals and oscillating signals during respective half-periods of a clock signal, with each of the oscillating signals having a phase determined by an immediately preceding metastable seed signal in the alternating sequence. The sampling unit may also be configured to detect a logic value of each consecutive oscillating signal during a portion of a respective half-period of the clock signal. According to some of these embodiments of the invention, the signal generator may be responsive to the clock signal and sampling unit may be responsive to a delayed version of the clock signal.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
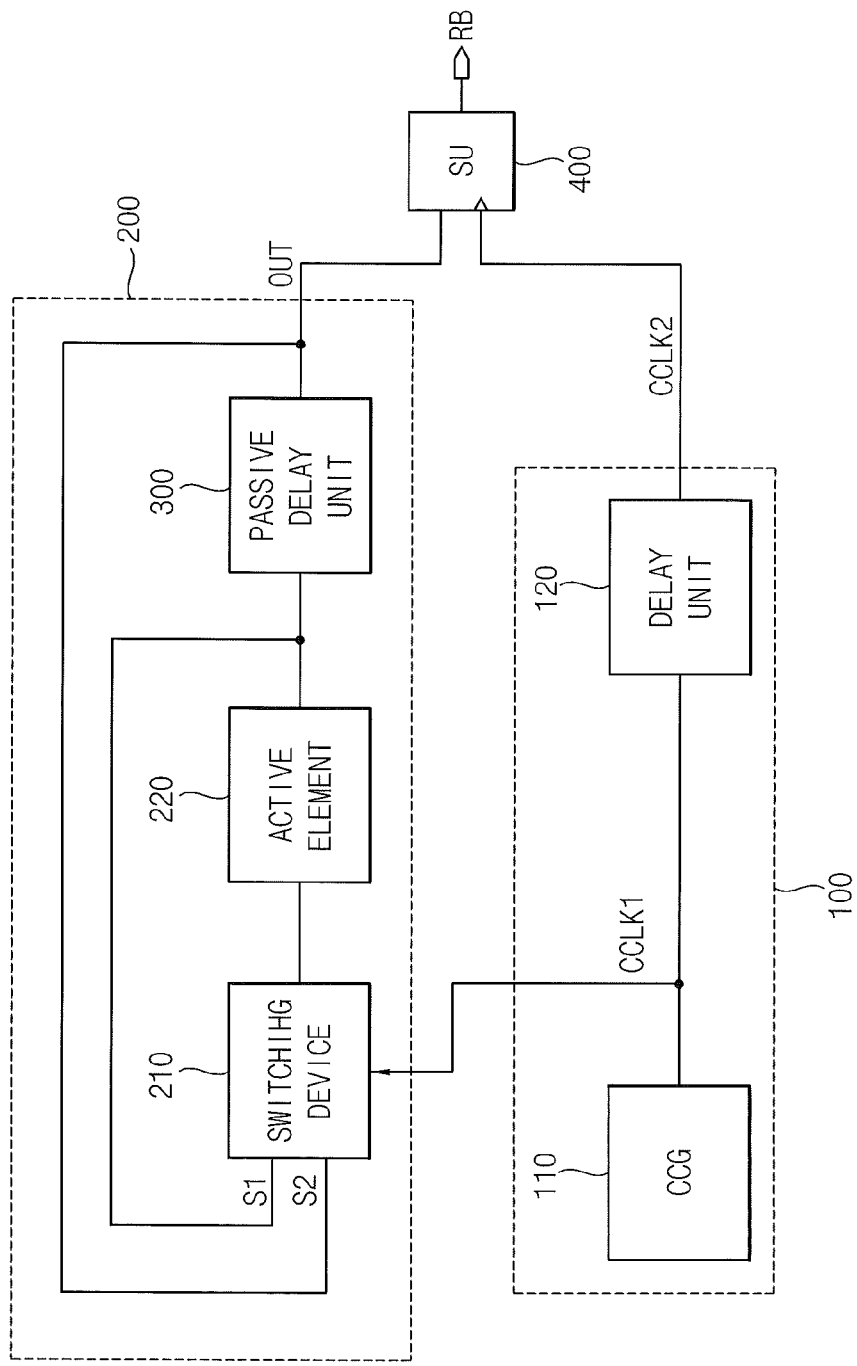
FIG. 1 is a block diagram illustrating a random number generator according to some example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a random number generator according to some example embodiments. Referring to FIG. 1, a random number generator 10 includes a control clock generating unit 100, an output signal providing unit 200 and a sampling unit 400. The control clock generating unit 100 includes a control clock generator 110 and a delay unit 120. The control clock generator 110 generates a first control clock signal CCLK1 and the delay unit 120 delays the first control clock signal CCLK1 to provide a second control clock signal CCLK2.

The output signal providing unit 200 includes an active element 220 which operates as an entropy source. The output signal providing unit 200 provides an output signal converging to a meta-stable state based on accumulated entropy in a first logic level of the first control clock signal CCLK1 and provides an oscillating output signal OUT in a second logic level of the first control clock signal CCLK1. More specifically, the output signal providing unit 200 includes a switching device 210, an active element 220, which operates as the entropy source, and a passive delay unit 300.

The switching device 210 connects an input of the active element 220 to a converging path S1 when the first control clock signal CCLK1 has a first logic level, and connects the input of the active element 220 to an oscillating path S2 when the first control clock signal CCLK1 has a second logic level. As will be described later, the input and an output of the active element 220 are connected to each other in the first logic level of the first control clock signal CCLK1. Therefore, the active element 220 forms a feedback loop when the first control clock signal CCLK1 has the first logic level. The input of the active element 220 is connected to the output of the passive delay unit 300 when the first control clock signal CCLK1 has the second logic level and, thus, the active element 220 performs an oscillating operation as a ring oscillator. The sampling unit (SU) 400 samples the oscillating output signal to output a random bit RB in synchronization with the second control clock signal CCLK2.

Figure 2:
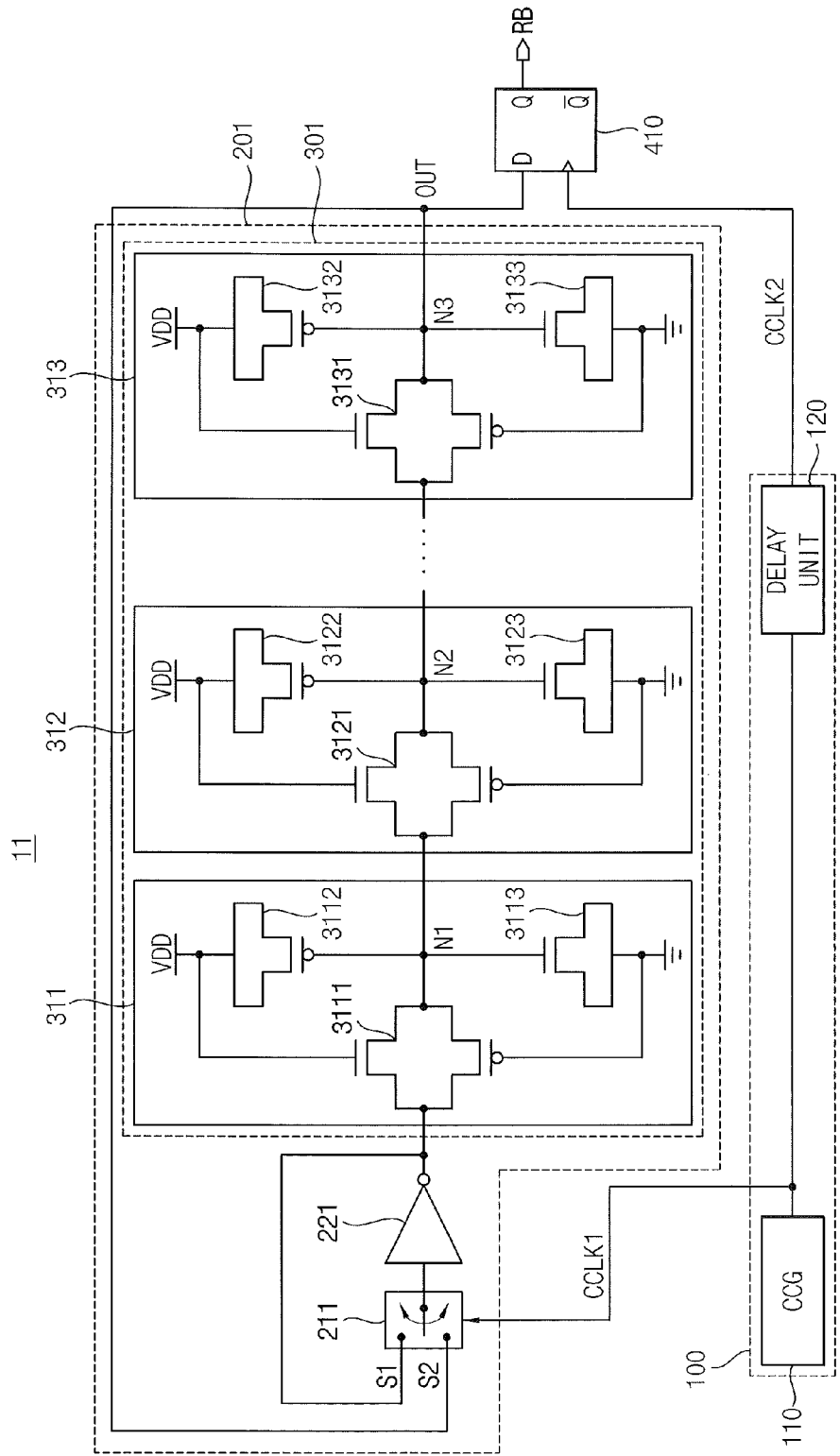
FIG. 2 is a circuit diagram illustrating an example of a random number generator of FIG. 1 according to some example embodiments.

FIG. 2 is a circuit diagram illustrating an example of a random number generator of FIG. 1 according to some example embodiments. Referring to FIG. 2, a random number generator 11 includes a control clock generating unit 100, an output signal providing unit 201 and a sampling unit 410. The output signal providing unit 201 includes an active element 221 which operates as an entropy source. The output signal providing unit 201 provides the output signal converging to the meta-stable state when the first control clock signal CCLK1 has the first logic level and provides the oscillating output signal OUT when the first control clock signal CCLK1 has the second logic level. More specifically, the output signal providing unit 201 includes a three-terminal switch 211, an inverter 221 operating as the entropy source and a passive delay unit 301. That is, in FIG. 2, the switching device 210 in FIG. 1 is implemented with the three-terminal switch 211, and the active element 220, which operates as the entropy source, is implemented with the inverter 221.

The passive delay unit 301 may includes a plurality of passive delay elements 311, 312, and 313 which are cascade-connected with respect to one another. The passive delay element 311 includes a transmission gate 3111, a p-type metal oxide semiconductor (PMOS) capacitor (first MOS capacitor) 3112 and an n-type metal oxide semiconductor (NMOS) capacitor (second MOS capacitor) 3113. The transmission gate 3111 may be implemented with PMOS and NMOS transistors, and the PMOS capacitor 3112 is connected to a power supply voltage VDD. In addition, the PMOS capacitor 3112 is connected to the transmission gate 3111 at a connection node N1. The PMOS capacitor 3112 is connected to the NMOS capacitor 3113 at the connection node N1. The NMOS capacitor 3113 is connected to a ground and connected to the transmission gate 3111 at the connection node N1.

The passive delay element 312 includes a transmission gate 3121, a PMOS capacitor 3122 and an NMOS capacitor 3123. The transmission gate 3121 may be implemented with PMOS and NMOS transistors, and the PMOS capacitor 3122 is connected to the power supply voltage VDD. In addition, the PMOS capacitor 3122 is connected to the transmission gate 3121 at a connection node N2. The PMOS capacitor 3122 is connected to the NMOS capacitor 3123 at the connection node N2. The NMOS capacitor 3123 is connected to the ground and connected to the transmission gate 3121 at the connection node N2.

The passive delay element 313 includes a transmission gate 3131, a PMOS capacitor 3132 and an NMOS capacitor 3133. The transmission gate 3131 may be implemented with PMOS and NMOS transistors, and the PMOS capacitor 3132 is connected to the power supply voltage VDD. In addition, the PMOS capacitor 3132 is connected to the transmission gate 3131 at a connection node N3. The PMOS capacitor 3132 is connected to the NMOS capacitor 3133 at the connection node N3. The NMOS capacitor 3133 is connected to the ground and connected to the transmission gate 3131 at the connection node N3. The transistors included in the passive delay unit 301 may be fabricated according to a standard complementary metal oxide semiconductor (CMOS) process, and all transistors included in the passive delay unit 301 are passive elements. That is, the output signal providing unit 201 includes only one active element (here, the inverter 221). The sampling unit 410 includes a D flip-flop, and the sampling unit 410 samples the oscillating output signal OUT to provide the random bit RB in synchronization with the second control clock signal CCLK2.

Figure 3:
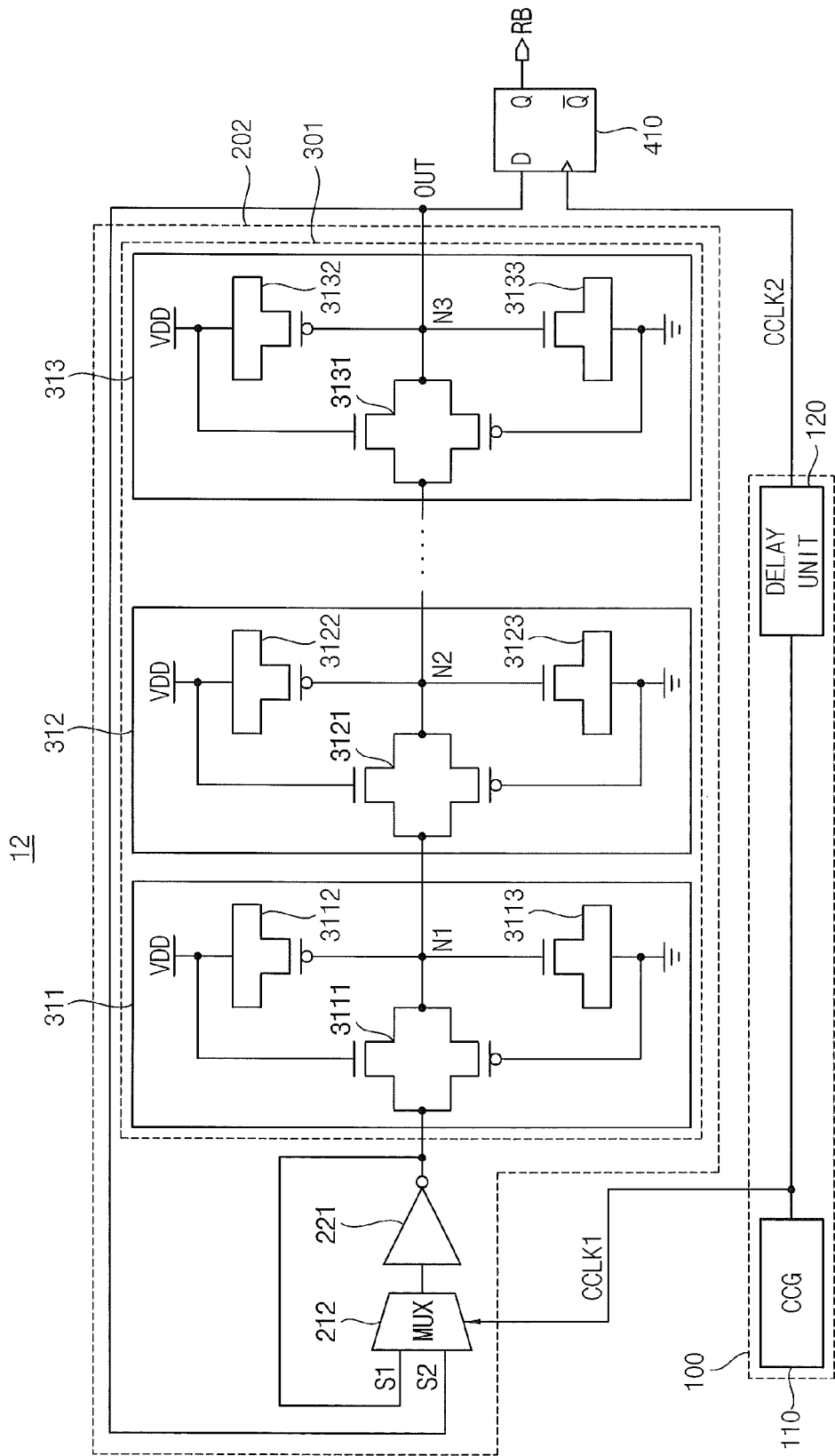
FIG. 3 is a circuit diagram illustrating an example of a random number generator of FIG. 1 according to other example embodiments.

FIG. 3 is a circuit diagram illustrating an example of a random number generator of FIG. 1 according to other example embodiments. Referring to FIG. 3, a random number generator 12 includes a control clock generating unit 100, an output signal providing unit 202 and a sampling unit 410. The random number generator 12 of FIG. 3 differs from the random number generator 11 of FIG. 2 in that the switching device 210 in FIG. 1 includes a multiplexer 212. Other components except the multiplexer 212 in the random number generator 12 of FIG. 3 are same as corresponding components in the random number generator 11 of FIG. 2. Therefore, detailed description of the corresponding components in the random number generator 12 of FIG. 3 will be omitted.

The multiplexer 212 in FIG. 3, which operates as a switching device, has a control terminal receiving the first control clock signal CCLK1. Therefore, the multiplexer 212 connects (selects) the converging path S1 to the input of the inverter 221 (active element) in the first logic level of the first control clock signal CCLK1, and connects (selects) the oscillating path S2 to the input of the inverter 221 (active element) in the second logic level of the first control clock signal CCLK1.

Figure 4:
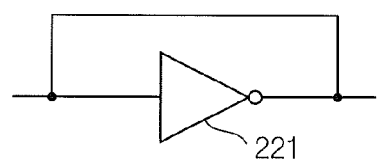
FIG. 4 illustrates the inverter in FIG. 3 when the first control clock signal is in the first logic level.

FIG. 4 illustrates the inverter in FIG. 3 when the first control clock signal is in the first logic level. Referring to FIG. 4, when the first control clock signal CCLK1 is in the first logic level, the input and output of the inverter 221 operating as the entropy are connected together, and thus the inverter 221 forms a feedback loop. When a first delay time of the inverter 221 is longer than a second delay time of the feedback loop, from the output of the invert 221 to the input of the inverter 221, an output signal of the inverter 221 is maintained at a meta-stable state. When the output signal of the inverter 221 is maintained at the meta-stable state, the output signal of the inverter 221 is interpreted as neither logic high level nor logic low level. When the output signal of the inverter 221 is maintained at the meta-stable state, and the output of the inverter 221 is connected to the passive delay elements 311, 312 and 313 of the passive delay unit 301 in FIG. 3, the output signal OUT also in the meta-stable state in case of the first control clock signal CCLK1 having the first logic level.

Figure 5:
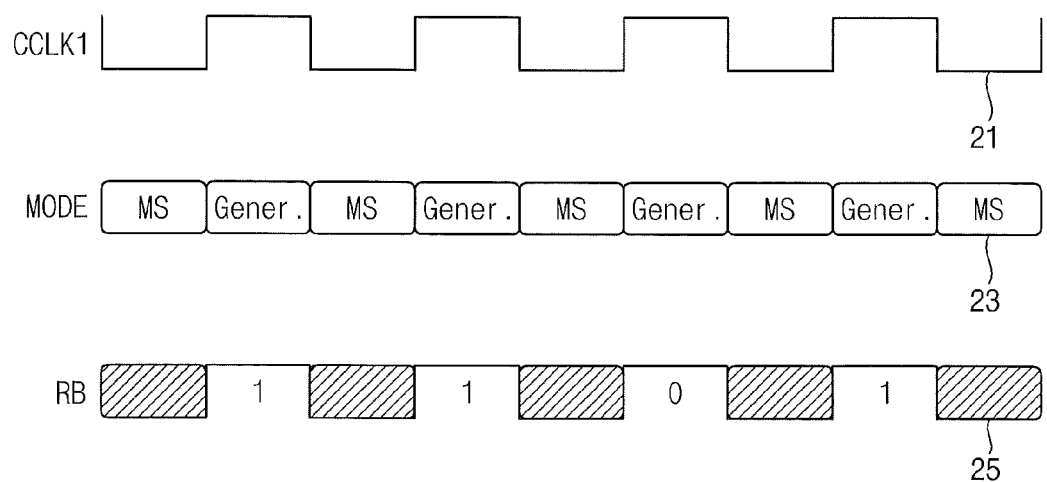
FIG. 5 illustrates a diagram of a signal that is input into and output from the random number generator of FIG. 3.

FIG. 5 illustrates a diagram of a signal that is input into and output from the random number generator of FIG. 3. Referring to FIG. 5, the random number generator 12 of FIG. 3 generates the first control clock signal CCLK1 having a predetermined period or desired period as illustrated by a reference numeral 21. Operation of the random number generator 12 according to example embodiments may be divided into two operation modes. In a first operation mode, the first control clock signal CCLK1 has a first logic level (for example, a logic low level). In a second operation mode, the first control clock signal CCLK1 has a second logic level (for example, a logic high level).

In the first operation mode indicated as "MS" of a diagram 23, the switching device 210 in FIG. 1 is connected to the converging path S1 or the multiplexer 212 in FIG. 3 selects the converging path S1. When the multiplexer 212 in FIG. 3 selects the converging path S1, the inverter 221 forms a feedback loop with the input and output of the inverter 221 being connected together. Therefore, the meta-stable voltage is output as the output signal VOUT in the first operation mode.

In the second operation mode indicated as "Gener." of a diagram 23, the switching device 210 in FIG. 1 is connected to the oscillating path S2 or the multiplexer 212 in FIG. 3 selects the oscillating path S2. When the multiplexer 212 in FIG. 3 selects the oscillating path S2, the inverter 221 and the passive delay elements 311, 312 and 313 forms a ring oscillator to perform an oscillation operation on the meta-stable voltage. Therefore, the oscillating output signal VOUT is provided in the second operation mode. When a delay time of the inverter 221 is shorter than a delay time of the passive delay elements 311, 312 and 313 in the second operation mode, the oscillating output signal VOUT oscillates with full ranges.

In addition, when a gain of the inverter 221 multiplied by a gain of a transfer function of the passive delay elements 311, 312 and 313 is greater than one, the full range oscillation may occur easily. Because the passive delay elements 311, 312 and 313 are passive, a gain of a transfer function of the passive delay unit 301 is a positive real number smaller than one. Therefore, the gain of the inverter 221 may be preferably much greater than one in the first operation mode. In addition, since a phase and a level of the output signal of the inverter 221 is determined based on the internal noise (thermal noise) of the inverter 221, the inverter 221 may operate as the entropy source.

When the inverter 221 operates as the entropy source well, the oscillating output signal OUT becomes more and more random and unpredictable, and thus randomness of the random bit RB indicated by reference numeral 25 in FIG. 5 increases in the second operation mode. Accordingly, performance of the random number generator 12 may be enhanced. In addition, since only the inverter 221 is implemented with an active element, the mismatch between the inverter 221 and the transistors in the passive delay unit 301 has little influence on the output signal OUT having meta-stable voltage in the first operation mode. In addition, when threshold voltage of the inverter 221 changes, the meta-stable state of the output signal OUT also changes according to the change of the threshold voltage of the inverter 221, and thus, the output signal of the inverter 221 converges to the threshold voltage of the inverter 221.

Although in FIGS. 2 and 3, the active element 200 in FIG. 1 employs the inverter, the active element 200 in FIG. 1 may employ a NAND gate or a NOR gate. When the active element 200 in FIG. 1 is implemented with a NAND gate or a NOR gate, two input terminals of the NAND gate or the NOR gate receive one input signal corresponding to the input signal of the inverter.

Figure 6:
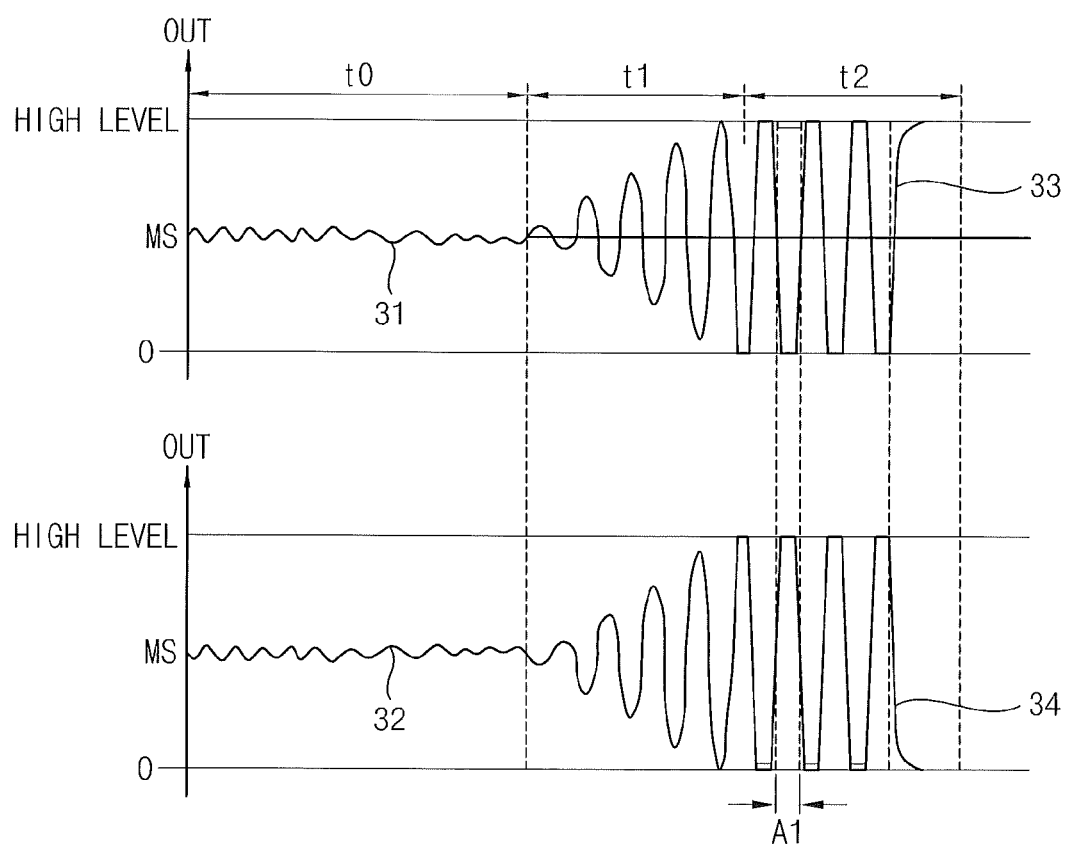
FIG. 6 illustrates a waveform diagram for explaining the output signal of the random number generator of FIG. 3.

FIG. 6 illustrates a waveform diagram for explaining the output signal of the random number generator of FIG. 3. Referring to FIG. 6, at a section t0, the meta-stable voltage 31 or 32, the output signal of the inverter 221 (active element), is provided as the output signal OUT in the first operation mode when the first control clock signal CCLK1 is in the first logic level. At sections t1 and t2, in the second operation mode when the first control clock signal CCLK1 in the second logic level, the inverter 221 and the passive delay elements 311, 312 and 313 in the passive delay unit 301 form the ring oscillator, and thus the oscillating output signal OUT 33 or 34 is provided from the output signal providing unit 301.

The inverter may have thermal noises due to the circuit operations. The thermal noise may operate as a noise source having irreversibility. Therefore, at the section t0, the meta-stable voltage is output from the inverter 221. The thermal noise has irregularity, and thus, upward or downward oscillation operation occurs in the second operation mode. The upward or downward oscillation operation begins randomly, and thus, the random bit RB based on the upward or downward oscillation operation also has randomness. The reference numeral 33 indicates that the metal stable voltage begins to oscillate in the upward direction. The reference numeral 34 indicates that the metal stable voltage begins to oscillate in the downward direction.

The sampled value of the oscillating output signal OUT in the sampling unit 410 is determined based on whether the meta-stable voltage begins to oscillate in the upward direction or in the downward direction. At a duration A1, the logic high level of the oscillating output signal OUT is sampled in the reference numeral 33, however, the logic low level of the oscillating output signal OUT is sampled in the reference numeral 34. The random number generator 12 has non-periodicity and unpredictability that whether the logic high or low level is sampled is not known.

The sampling operation of the sampling unit 410 is performed at the section t2 where the output signal OUT stably oscillates. At the section t1, a transition process is performed. For example, when the oscillation starts, amplitude increases and converges to a predetermined or given value. The section t1 between the start and end of the oscillation is referred to as a transition process section. A period of time taken for the transition process section t1 has a very small value (generally a nano second value) with several periods generally.

Because the sampling operation of the sampling unit 410 is performed after the transition process section t1 elapses, the second control clock signal (a sampling clock signal) is a phase-delayed signal by a predetermined or given delay time with respect to the first control clock signal CCLK1. The predetermined or given delay time may be determined according to the period of time taken for the transition process section t1. The time taken for the transition process section t1 is a value that may be changed according to maximum voltage amplitude, or specification of inverting elements (for example, inverters).

The inverter 221 operating as the entropy has different thermal noises whenever the inverter 221 operates, the output signal OUT has an irregular toggling direction. Therefore, the random bit RB that is output of the sampling unit 410 includes 1, 1, 0 and 1 at random as indicated by the reference numeral 25 in FIG. 5. The hatched portions in the reference numeral 25 indicate the meta-stable voltage which the sampling unit 410 regards as neither logic high level nor logic low level.

Figure 7:
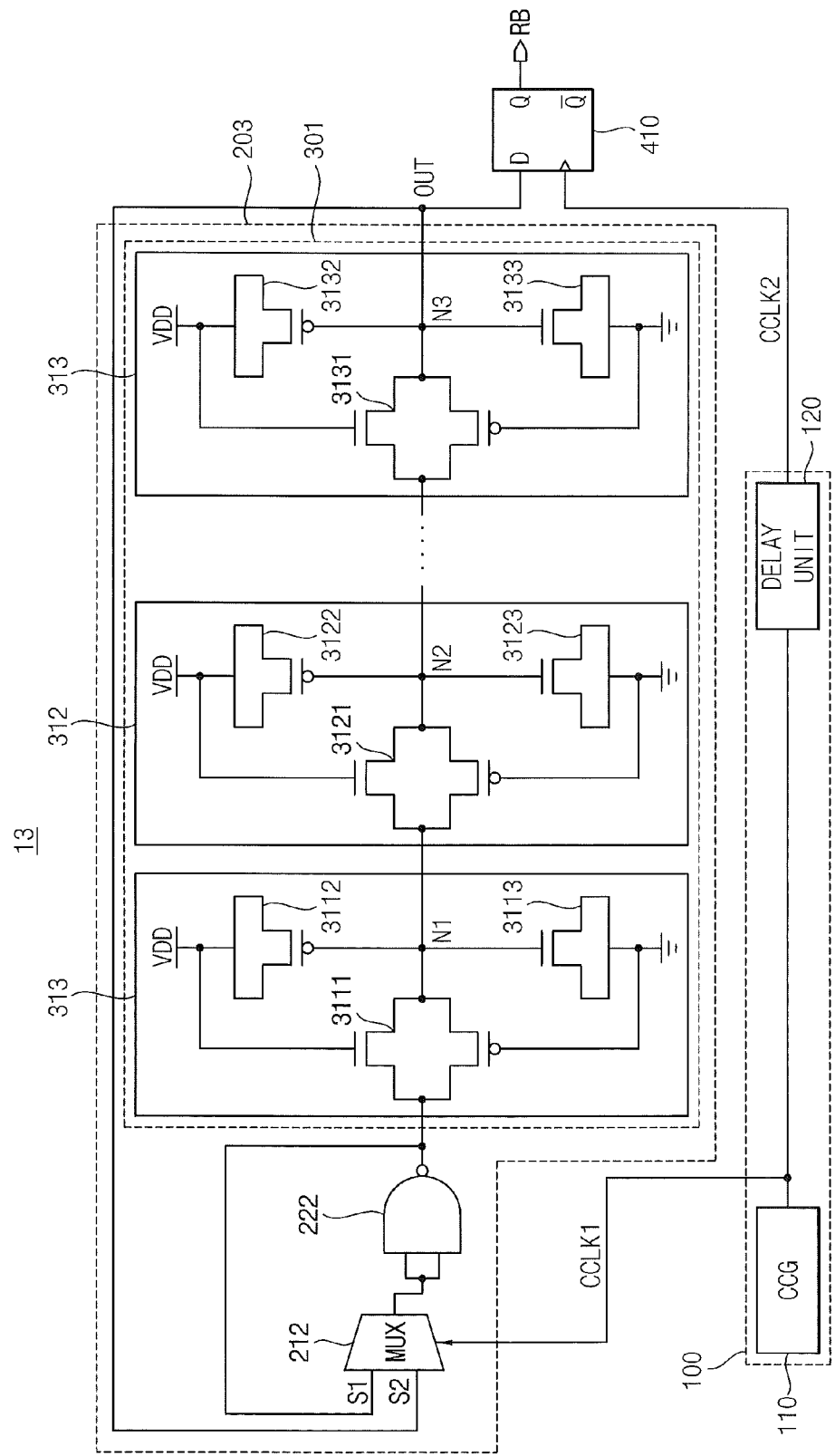
FIG. 7 is a circuit diagram illustrating an example of a random number generator of FIG. 1 according to still other example embodiments.

FIG. 7 is a circuit diagram illustrating an example of a random number generator of FIG. 1 according to still other example embodiments. Referring to FIG. 7, a random number generator 13 includes a control clock generating unit 100, an output signal providing unit 204 and a sampling unit 410.

The random number generator 13 of FIG. 7 differs from the random number generator 12 of FIG. 3 in that active element 220 in FIG. 1 includes a NAND gate 222 instead of the inverter 221. Other components except the NAND gate 222 in the random number generator 13 of FIG. 7 are same as corresponding components in the random number generator 12 of FIG. 3. Therefore, detailed description of the corresponding components in the random number generator 13 of FIG. 7 will be omitted. The NAND gate 222 has two input terminals commonly connected to the output of the multiplexer 212.

Figure 8:
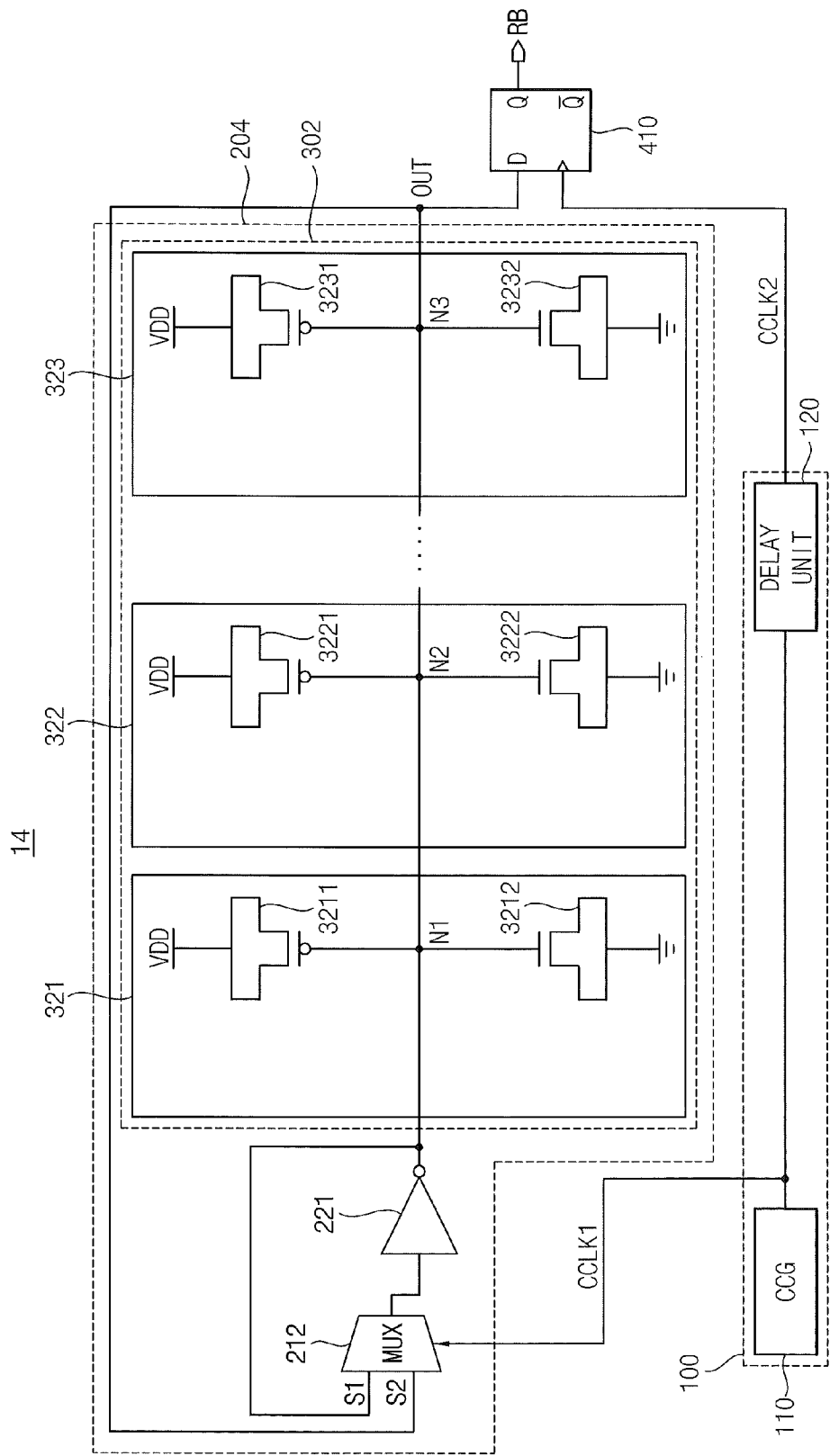
FIG. 8 is a circuit diagram illustrating an example of a random number generator of FIG. 1 according to still other example embodiments.

FIG. 8 is a circuit diagram illustrating an example of a random number generator of FIG. 1 according to still other example embodiments. Referring to FIG. 8, a random number generator 14 includes a control clock generating unit 100, an output signal providing unit 204 and a sampling unit 410.

The random number generator 14 of FIG. 8 differs from the random number generator 12 of FIG. 3 in that a passive delay unit 302 included in the output signal providing unit 204 includes a plurality of passive delay elements 321, 322 and 323. The passive delay element 321 includes a PMOS capacitor 3211 and a NMOS capacitor 3212. The PMOS capacitor 3211 is connected to the power supply voltage VDD and the NMOS capacitor 3212 is connected to the ground voltage. The PMOS capacitor 3211 and the NMOS capacitor 3212 are connected to each other at a connection node N1. The passive delay element 322 includes a PMOS capacitor 3221 and a NMOS capacitor 3222. The PMOS capacitor 3221 is connected to the power supply voltage VDD and the NMOS capacitor 3222 is connected to the ground voltage. The PMOS capacitor 3221 and the NMOS capacitor 3222 are connected to each other at a connection node N2. The passive delay element 323 includes a PMOS capacitor 3231 and a NMOS capacitor 3232. The PMOS capacitor 3231 is connected to the power supply voltage VDD and the NMOS capacitor 3232 is connected to the ground voltage. The PMOS capacitor 3231 and the NMOS capacitor 3232 are connected to each other at a connection node N3. Other components except the passive delay elements 321, 322 and 323 in the random number generator 14 of FIG. 8 are same as corresponding components in the random number generator 12 of FIG. 3. Therefore, detailed description of the corresponding components in the random number generator 14 of FIG. 8 will be omitted. The transistors included in the passive delay unit 302 are all fabricated according to a standard complementary metal oxide semiconductor (CMOS) process, and all transistors included in the passive delay unit 301 are passive elements.

Figure 9:
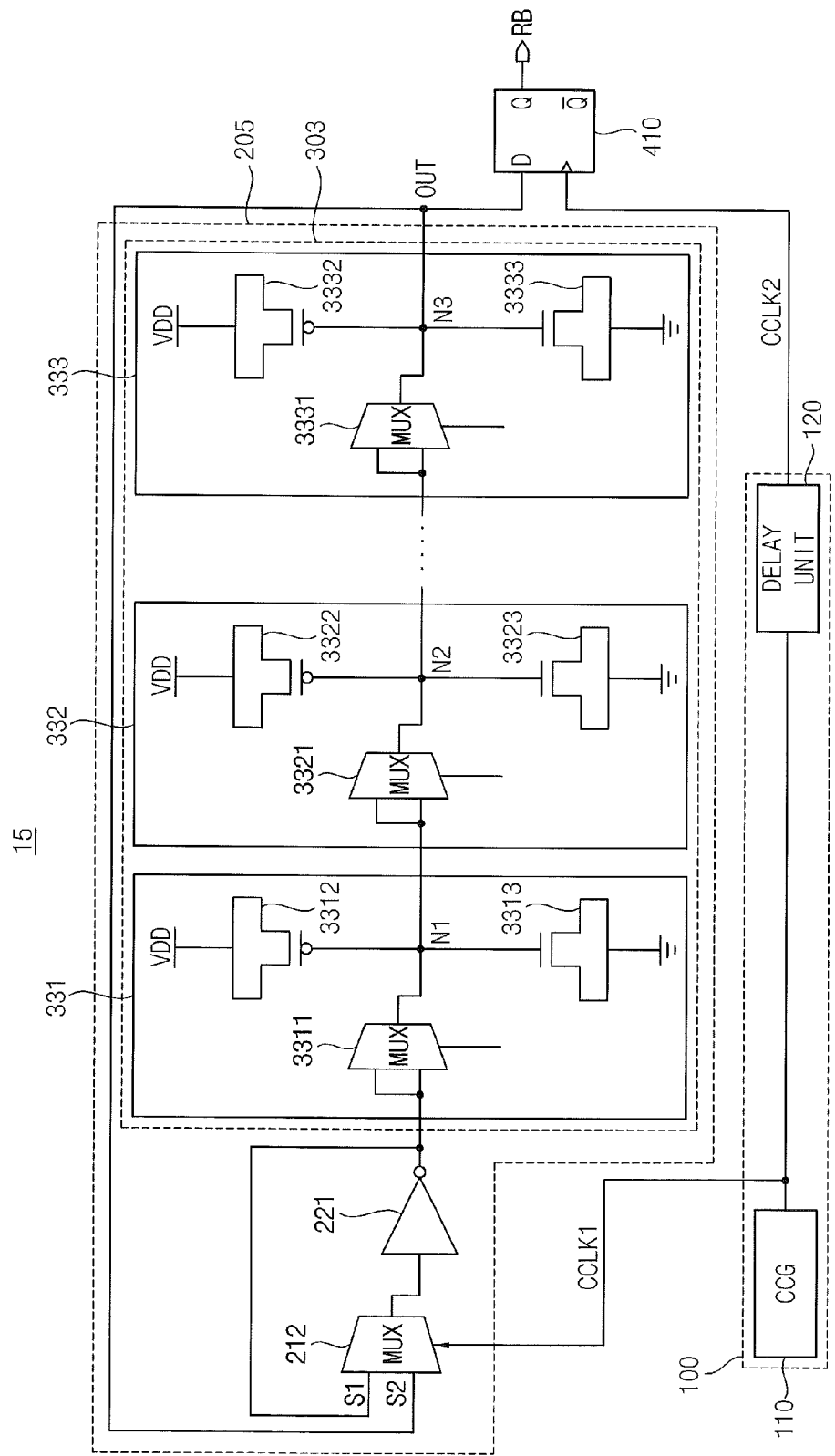
FIG. 9 is a circuit diagram illustrating an example of a random number generator of FIG. 1 according to still other example embodiments.

FIG. 9 is a circuit diagram illustrating an example of a random number generator of FIG. 1 according to still other example embodiments. Referring to FIG. 9, a random number generator 15 includes a control clock generating unit 100, an output signal providing unit 205 and a sampling unit 410. The random number generator 15 of FIG. 9 differs from the random number generator 12 of FIG. 3 in that a passive delay unit 303 included in the output signal providing unit 205 includes a plurality of passive delay elements 331, 332 and 333.

The passive delay element 331 includes a multiplexer 3311 a PMOS capacitor 3312 and a NMOS capacitor 3313. The PMOS capacitor 3312 is connected to the power supply voltage VDD and is connected to the multiplexer 3311 at a connection node N1. The NMOS capacitor 3313 is connected to the ground voltage, and is connected to the multiplexer 3311 at the connection node N1. The multiplexer 3311 has two input terminal receiving one input signal. The passive delay element 332 includes a multiplexer 3321 a PMOS capacitor 3322 and a NMOS capacitor 3323. The PMOS capacitor 3322 is connected to the power supply voltage VDD and is connected to the multiplexer 3321 at a connection node N2. The NMOS capacitor 3323 is connected to the ground voltage, and is connected to the multiplexer 3321 at the connection node N2. The multiplexer 3321 has two input terminal receiving one input signal. The passive delay element 333 includes a multiplexer 3331 a PMOS capacitor 3332 and a NMOS capacitor 3333. The PMOS capacitor 3332 is connected to the power supply voltage VDD and is connected to the multiplexer 3331 at a connection node N3. The NMOS capacitor 3333 is connected to the ground voltage, and is connected to the multiplexer 3331 at the connection node N3. The multiplexer 3331 has two input terminal receiving one input signal. Other components except the passive delay elements 331, 332 and 333 in the random number generator 15 of FIG. 9 are same as corresponding components in the random number generator 12 of FIG. 3. Therefore, detailed description of the corresponding components in the random number generator 15 of FIG. 9 will be omitted. The transistors included in the passive delay unit 303 are all fabricated according to a standard complementary metal oxide semiconductor (CMOS) process, and all transistors included in the passive delay unit 303 are passive elements.

Figure 10:
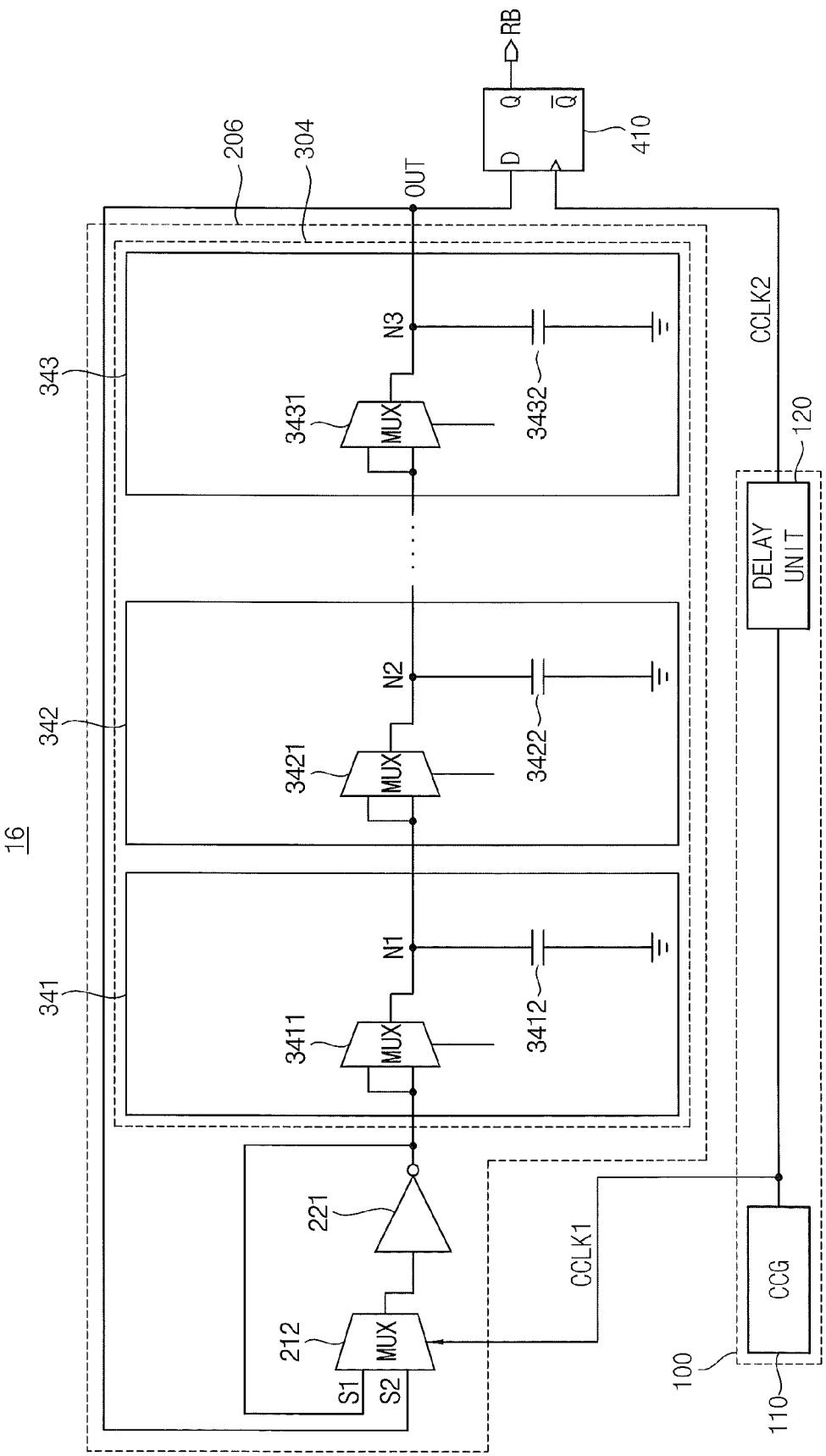
FIG. 10 is a circuit diagram illustrating an example of a random number generator of FIG. 1 according to still other example embodiments.

FIG. 10 is a circuit diagram illustrating an example of a random number generator of FIG. 1 according to still other example embodiments. Referring to FIG. 10, a random number generator 16 includes a control clock generating unit 100, an output signal providing unit 206 and a sampling unit 410.

The random number generator 16 of FIG. 10 differs from the random number generator 12 of FIG. 3 in that a passive delay unit 304 included in the output signal providing unit 206 includes a plurality of passive delay elements 341, 342 and 343.

The passive delay element 341 includes a multiplexer 3411 and a capacitor 3412. The multiplexer 3411 is connected to the capacitor 3412 at a connection node N1, and the capacitor 3412 is connected to the ground voltage. The multiplexer 3411 has two input terminal receiving one input signal. The passive delay element 342 includes a multiplexer 3421 and a capacitor 3422. The multiplexer 3421 is connected to the capacitor 3422 at a connection node N2, and the capacitor 3422 is connected to the ground voltage. The multiplexer 3421 has two input terminal receiving one input signal. The passive delay element 343 includes a multiplexer 3431 and a capacitor 3432. The multiplexer 3431 is connected to the capacitor 3432 at a connection node N3, and the capacitor 3432 is connected to the ground voltage. The multiplexer 3431 has two input terminal receiving one input signal. The transistors included in the passive delay unit 304 are all fabricated according to a standard complementary metal oxide semiconductor (CMOS) process, and all transistors included in the passive delay unit 304 are passive elements.

Figure 11:
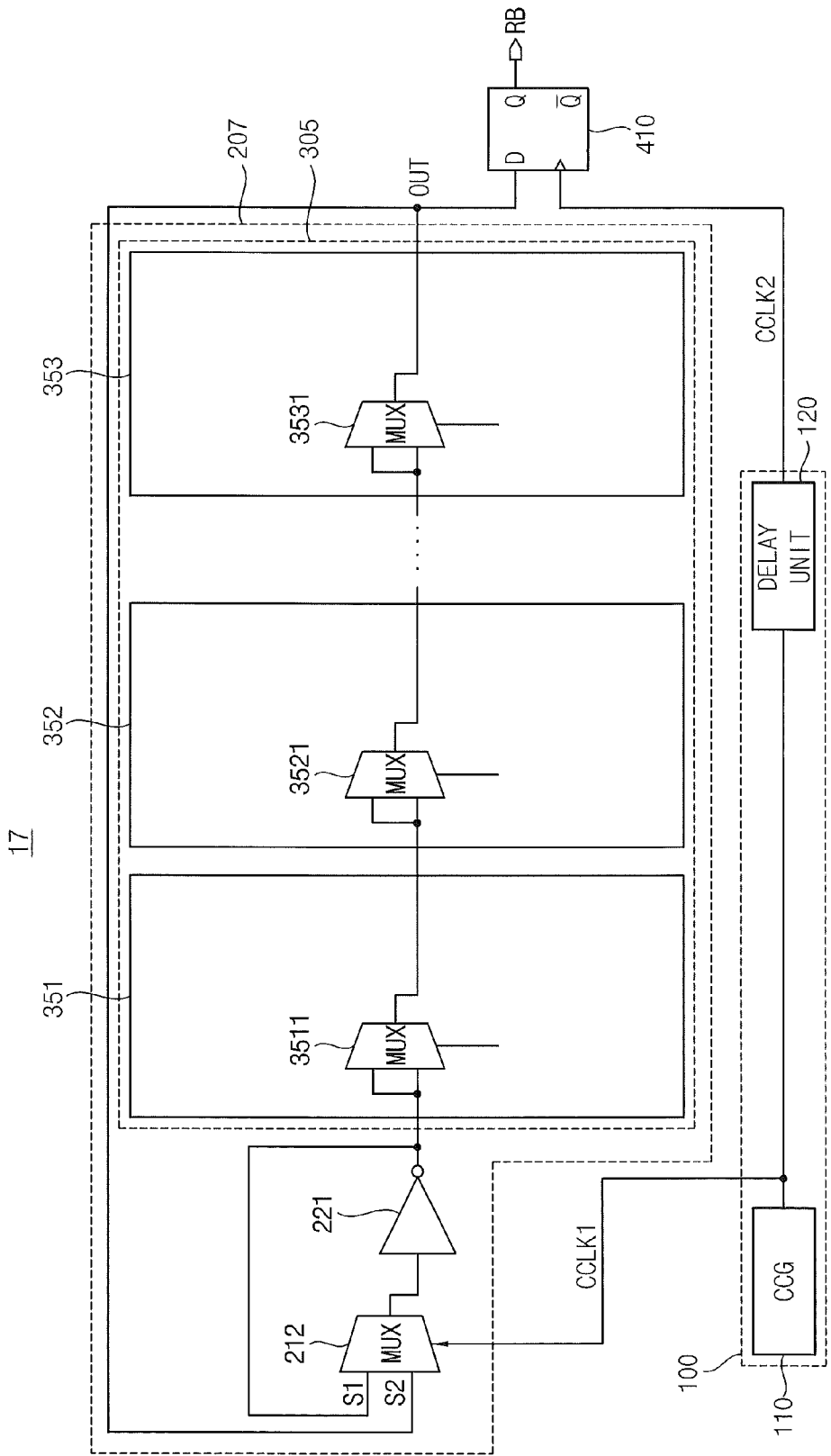
FIG. 11 is a circuit diagram illustrating an example of a random number generator of FIG. 1 according to still other example embodiments.

FIG. 11 is a circuit diagram illustrating an example of a random number generator of FIG. 1 according to still other example embodiments. Referring to FIG. 11, a random number generator 17 includes a control clock generating unit 100, an output signal providing unit 207 and a sampling unit 410.

The random number generator 17 of FIG. 11 differs from the random number generator 16 of FIG. 10 in that a passive delay unit 305 included in the output signal providing unit 207 includes a plurality of passive delay elements 351, 352 and 353.

The passive delay unit 351 includes a multiplexer 3511. The multiplexer 3511 has two input terminal receiving one input signal. The passive delay unit 352 includes a multiplexer 3521. The multiplexer 3521 has two input terminal receiving one input signal. The passive delay unit 353 includes a multiplexer 3531. The multiplexer 3531 has two input terminal receiving one input signal. The components included in the passive delay unit 305 are all passive elements.

Figure 12:
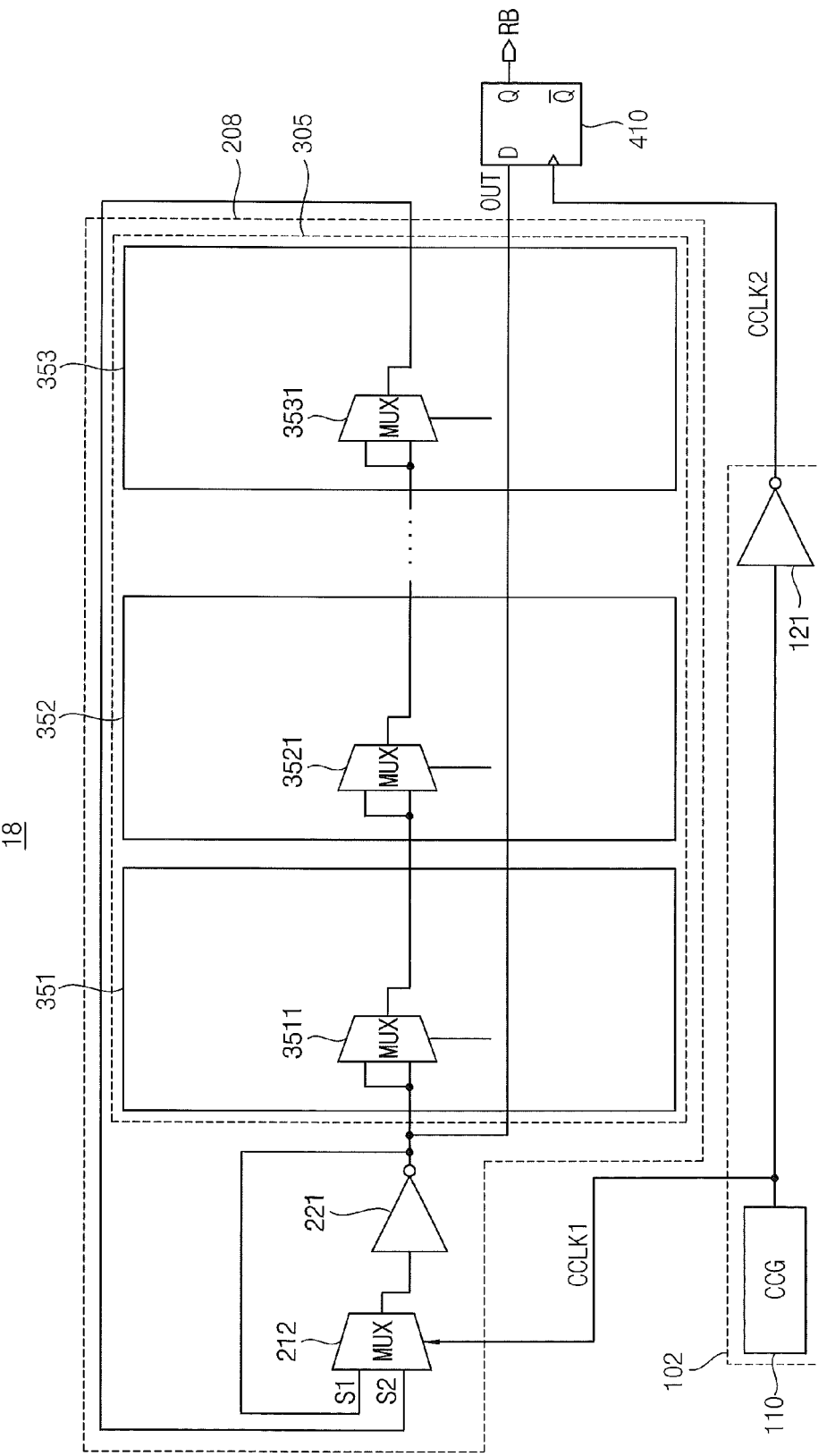
FIG. 12 is a circuit diagram illustrating an example of a random number generator of FIG. 1 according to still other example embodiments.

FIG. 12 is a circuit diagram illustrating an example of a random number generator of FIG. 1 according to still other example embodiments. Referring to FIG. 12, a random number generator 18 includes a control clock generating unit 102, an output signal providing unit 208 and a sampling unit 410.

Figure 17:
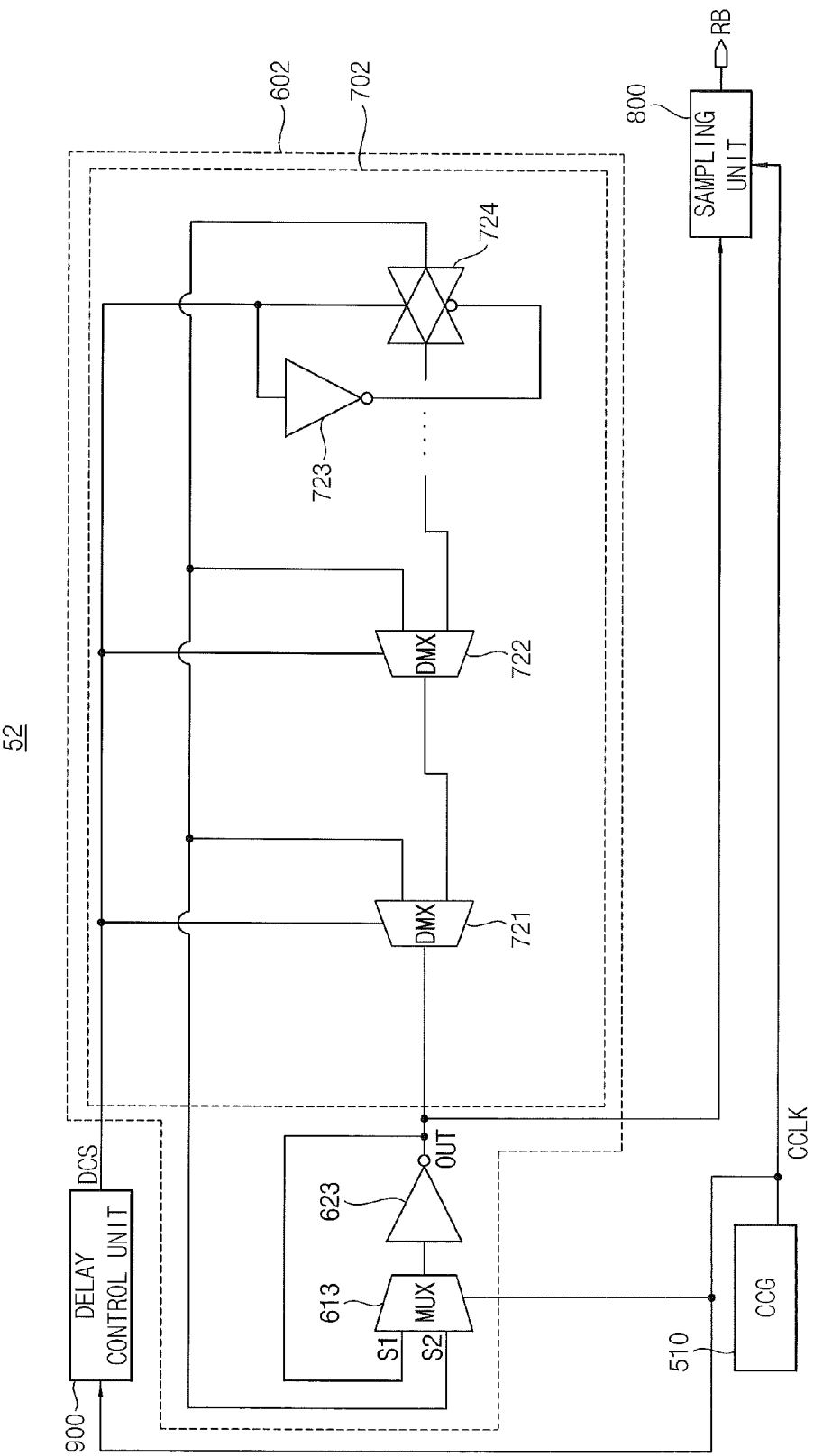
FIG. 17 is a circuit diagram illustrating an example of the random number generator of FIG. 14 according to other example embodiments.

The random number generator 18 of FIG. 12 differs from the random number generator 17 of FIG. 17 in that the control clock generating unit 102 includes an inverter 121 as the delay unit and the output of the inverter 221 is applied to the sampling unit 410 as the output signal OUT.

Figure 13:
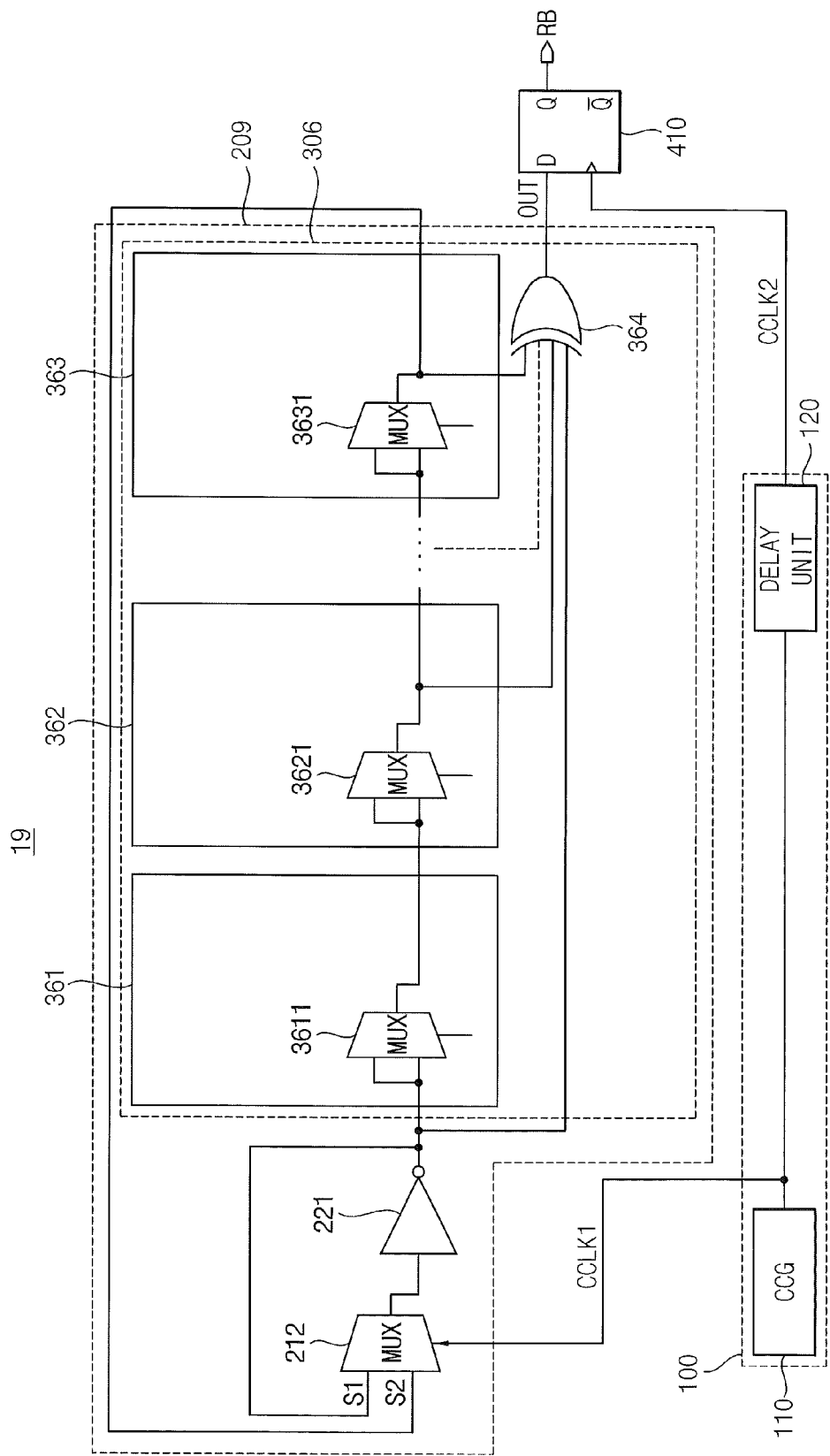
FIG. 13 is a circuit diagram illustrating an example of a random number generator of FIG. 1 according to still other example embodiments.

FIG. 13 is a circuit diagram illustrating an example of a random number generator of FIG. 1 according to still other example embodiments. Referring to FIG. 13, a random number generator 19 includes a control clock generating unit 100, an output signal providing unit 209 and a sampling unit 410.

The random number generator 1 of FIG. 13 differs from the random number generator 17 of FIG. 11 in that a passive delay unit 306 included in the output signal providing unit 207 further an exclusive OR gate 364.

The passive delay unit 306 includes a plurality of passive delay elements 361, 362 and 363 and an exclusive OR gate 364. The passive delay unit 361 includes a multiplexer 3611. The multiplexer 3611 has two input terminal receiving one input signal. The passive delay unit 362 includes a multiplexer 3621. The multiplexer 3621 has two input terminal receiving one input signal. The passive delay unit 363 includes a multiplexer 3631. The multiplexer 3631 has two input terminal receiving one input signal. Outputs of the multiplexers 3611, 3621 and 3631 are connected to the exclusive OR gate 364. The output of the exclusive OR gate 364 is connected to the sampling unit 410, which is implemented with a D flip-flop, and the output of the exclusive OR gate 364 is sampled in synchronization with the second control clock signal. When the outputs of the multiplexers 3611, 3621 and 3631 are connected to the exclusive OR gate 364, a sampling probability in the transition process section t1 as illustrated with reference to FIG. 6 increases. In addition, a number of the outputs of the multiplexers 3611, 3621 and 3631 connected to the exclusive OR gate 364 may be variably selected using taps (not illustrated).

Figure 14:
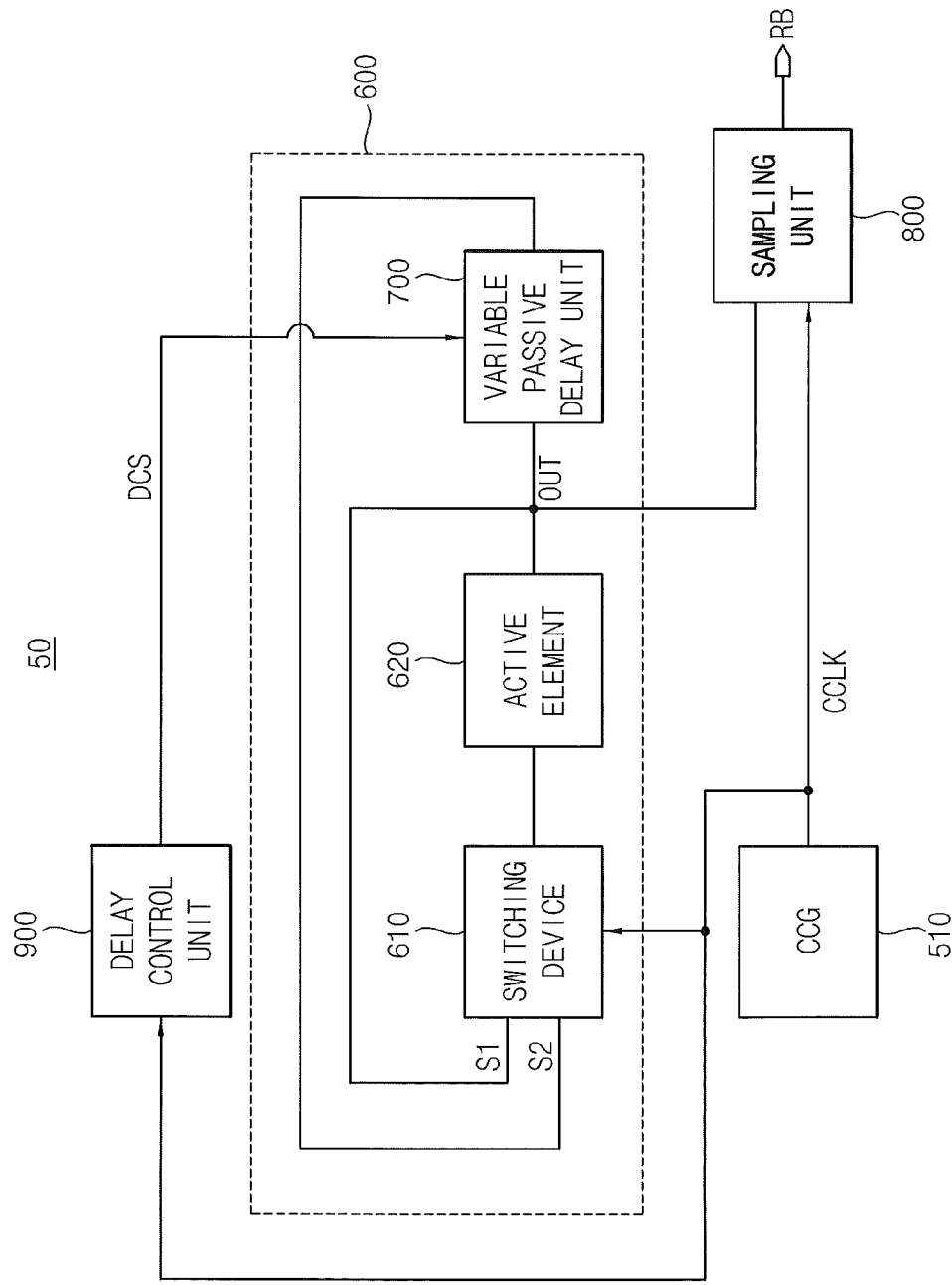
FIG. 14 is a block diagram illustrating a random number generator according to some example embodiments.

FIG. 14 is a block diagram illustrating a random number generator according to some example embodiments. Referring to FIG. 14, a random number generator 50 includes a control clock generator 510, an output signal providing unit 600, a sampling unit 800 and a delay control unit 900.

The control clock generator 510 generates a control clock signal CCLK, and provides the control clock signal CCLK to the output signal providing unit 600, the a sampling unit 800 and the delay control unit 900. Although the control clock generator 510 generates one control clock signal CCLK, the control clock generator 510 may generate a plurality of control clock signals to the output signal providing unit 600, the a sampling unit 800 and the delay control unit 900 respectively.

The output signal providing unit 600 includes an active element 620 which operates as an entropy source. The output signal providing unit 600 provides an output signal converging to a meta-stable state based on accumulated entropy in a first logic level of the control clock signal CCLK and provides an oscillating output signal OUT in a second logic level of the control clock signal. A frequency of the oscillating output signal OUT may be varied according to a delay control signal DCS provided from the delay control unit 900. More specifically, the output signal providing unit 600 includes a switching device 610, the active element 620 operating as the entropy source and a variable passive delay unit 700.

The switching device 610 connects an input of the active element 620 to a converging path S1 in the first logic level of the control clock signal CCLK, and connects the input of the active element 620 to an oscillating path S2 in the second logic level of the control clock signal CCLK. As will be described later, the input and an output of the active element 620 are connected to each other in the first logic level of the control clock signal CCLK. Therefore, the active element 620 forms a feedback loop in the first logic level of the control clock signal CCLK. The input of the active element 620 is connected to the output of the variable passive delay unit 600 in the second logic level of the control clock signal CCLK, and thus the active element 620 performs an oscillating operation as a ring oscillator in the second logic level of the control clock signal CCLK. The frequency of the oscillating output signal OUT may be varied according to the delay control signal DCS provided from the delay control unit 900.

The sampling unit 800 samples the oscillating output signal to output a random bit RB in response to the control clock signal CCLK.

The delay control unit generates the delay control signal DCS based on the control clock signal CCLK, and provides the delay control signal DCS to the variable passive delay unit 700.

Figure 15:
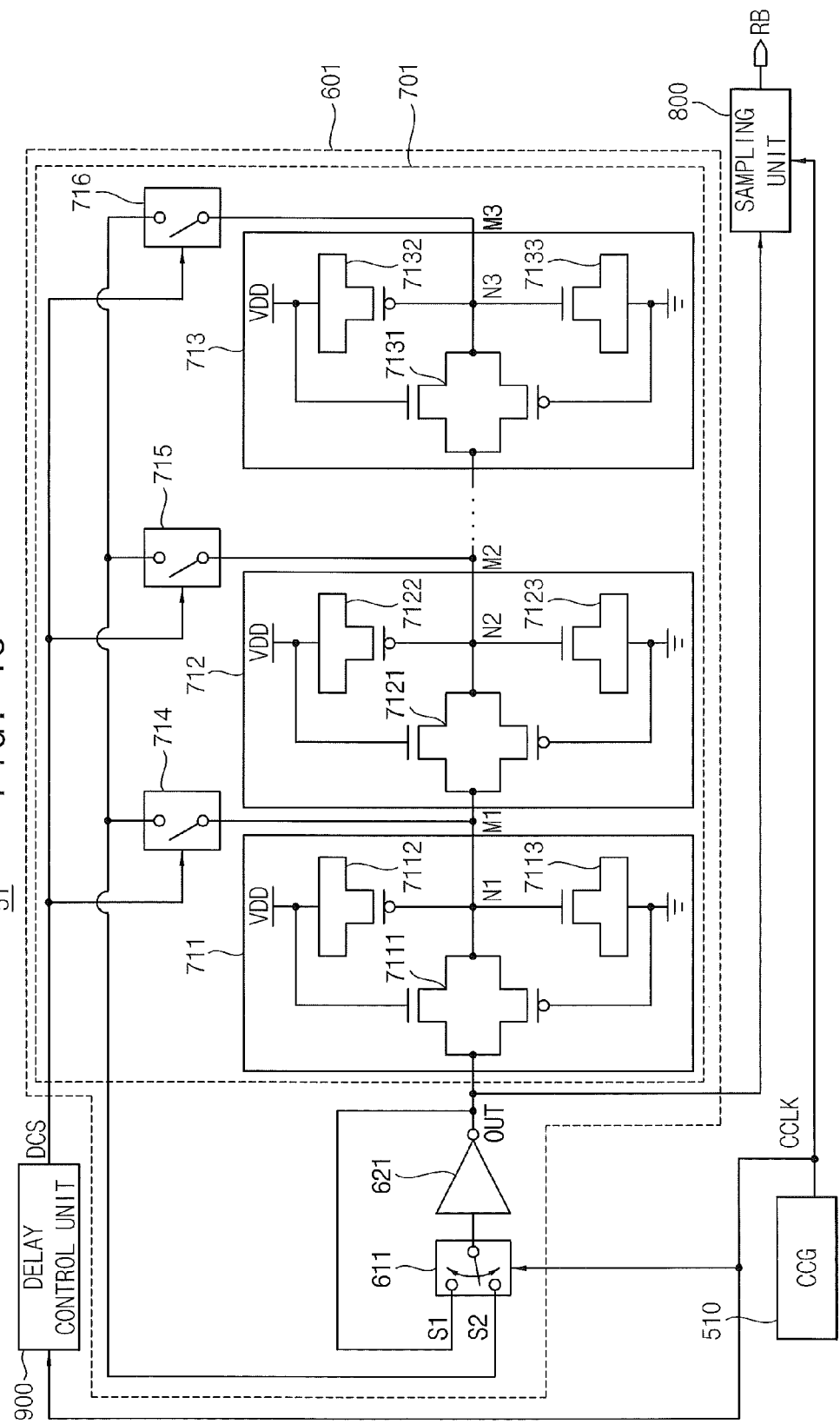
FIG. 15 is a circuit diagram illustrating an example of the random number generator of FIG. 14 according to some example embodiments.

FIG. 15 is a circuit diagram illustrating an example of the random number generator of FIG. 14 according to some example embodiments. Referring to FIG. 15, a random number generator 51 includes a control clock generator 510, an output signal providing unit 601, a sampling unit 800 and a delay control unit 900.

The output signal providing unit 601 includes an active element 621 which operates as an entropy source. The output signal providing unit 601 provides the output signal converging to the meta-stable state in the first logic level of the control clock signal CCLK and provides the oscillating output signal OUT whose frequency is varied according to the control clock signal DCS in the second logic level of the control clock signal CCLK. More specifically, the output signal providing unit 601 includes a three-terminal switch 611, an inverter 621 operating as the entropy source and a variable passive delay unit 701. That is, in FIG. 15, the switching device 610 in FIG. 14 is implemented with the three-terminal switch 211, and the active element 620 operating as the entropy source is implemented with the inverter 621.

The variable passive delay unit 701 may includes a plurality of passive delay elements 711, 712, and 713 which are cascaded-connected with respect to one another and a plurality of switches 714, 715 and 716.

The passive delay element 711 includes a transmission gate 7111, a PMOS capacitor (first MOS capacitor) 7112 and a NMOS capacitor (second MOS capacitor) 7113. The transmission gate 7111 may be implemented with PMOS and NMOS transistors, and the PMOS capacitor 7112 is connected to a power supply voltage VDD. In addition, the PMOS capacitor 7112 is connected to the transmission gate 3111 at a connection node N1. The PMOS capacitor 7112 is connected to the NMOS capacitor 7113 at the connection node N1. The NMOS capacitor 7113 is connected to a ground and connected to the transmission gate 3111 at the connection node N1.

The passive delay element 712 includes a transmission gate 7121, a PMOS capacitor 7122 and an NMOS capacitor 7123. The transmission gate 7121 may be implemented with PMOS and NMOS transistors, and the PMOS capacitor 7122 is connected to the power supply voltage VDD. In addition, the PMOS capacitor 7122 is connected to the transmission gate 7121 at a connection node N2. The PMOS capacitor 7122 is connected to the NMOS capacitor 7123 at the connection node N2. The NMOS capacitor 7123 is connected to the ground and connected to the transmission gate 7121 at the connection node N2.

The passive delay element 713 includes a transmission gate 7131, a PMOS capacitor 7132 and an NMOS capacitor 7133. The transmission gate 7131 may be implemented with PMOS and NMOS transistors, and the PMOS capacitor 7132 is connected to the power supply voltage VDD. In addition, the PMOS capacitor 7132 is connected to the transmission gate 7131 at a connection node N3. The PMOS capacitor 7132 is connected to the NMOS capacitor 7133 at the connection node N3. The NMOS capacitor 7133 is connected to the ground and connected to the transmission gate 7131 at the connection node N3.

Each of the switches 714, 715 and 716 is connected between each of nodes M1, M2 and M3 the oscillating path S2. Each of the nodes M1, M2 and M3 is connected to each of the connection nodes N1, N2 and N3. When one of the switches 714, 715 and 716 is connected in response to the delay control signal DCS, a delay amount of the output signal providing unit 604 is determined by one of the switches 714, 715 and 716, which is connected, while the output signal providing unit 604 performs oscillation operation. Therefore, the frequency of the oscillating output signal OUT is determined in response to the delay control signal DCS. That is, the delay control signal DCS determines which one of the switches 714, 715 and 716 is connected, and each of the passive delay elements 711, 712 and 713 is selectively included in the oscillating path S2 by the connected switch, thereby to vary the frequency of the oscillating output signal OUT.

The transistors included in the variable passive delay unit 701 are all fabricated according to a standard CMOS process, and all transistors included in the variable passive delay unit 701 are passive elements. That is, the output signal providing unit 201 includes only one active element (here, the inverter 621).

Figure 16:
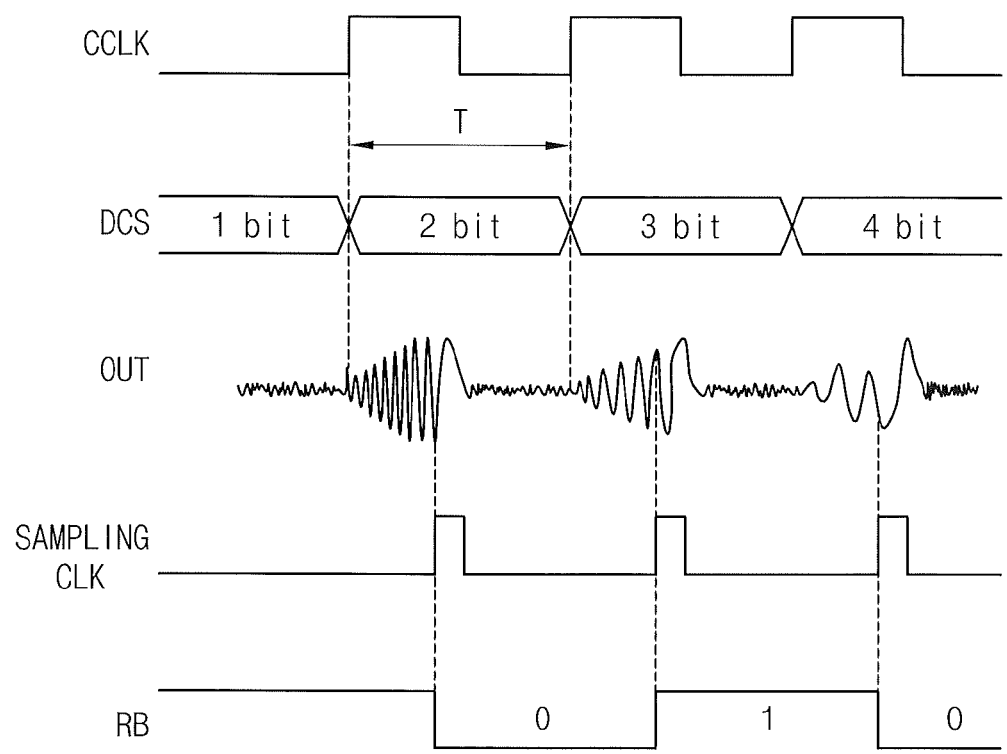
FIG. 16 illustrates a diagram of a signal that is input into and output from the random number generator of FIG. 15.

FIG. 16 illustrates a diagram of a signal that is input into and output from the random number generator of FIG. 15. Referring to FIG. 16, the control clock generator 510 in the random number generator 51 of FIG. 15 generates the control clock signal CCLK having a predetermined period or desired period.

Operation of the random number generator 51 according to example embodiments may be divided into two operation modes. In a first operation mode, the control clock signal CCLK has a first logic level (for example, a logic low level). In a second operation mode, the control clock signal CCLK has a second logic level (for example, a logic high level).

In the first operation mode, the switching device 611 in FIG. 15 is connected to the converging path S1, and in the second operation mode, the switching device 611 is connected to the oscillating path S2. When the switching device 611 is connected to the converging path S1, the input and output of the inverter 611 are connected together, and thus the inverter 611 forms a feedback loop. Therefore, the meta-stable voltage is provided as the output signal OUT in the first operation mode.

When the switching device 611 is connected to the oscillating path S2 in the second operation mode, the inverter 621 and selected some or all the passive delay units 311, 312 and 313 by the delay control signal DCS form a ring oscillator to perform oscillation operation on the meta-stable voltage. Therefore, the output signal providing unit 601 provides the oscillating output signal OUT whose frequency is varied. The sampling unit 800 samples the output signal OUT in response to a sampling clock signal SAMPLING CLK. The sampling clock signal SAMPLING CLK is generated in the sampling unit 800 based on the control clock signal CCLK.

FIG. 17 is a circuit diagram illustrating an example of the random number generator of FIG. 14 according to other example embodiments. Referring to FIG. 17, a random number generator 52 includes a control clock generator 510, an output signal providing unit 602, a sampling unit 800 and a delay control unit 900.

The random number generator 52 of FIG. 17 differs from the random number generator 51 of FIG. 15 in that the output signal providing unit 602 includes a variable passive delay unit 702 and a multiplexer 613 replaces the switching device 611.

The variable passive delay unit 702 includes a plurality of demultiplexers 721, 722, ..., an inverter 723 and a pass gate 724. Each of the demultiplexers 721, 722 ... has a control terminal receiving the delay control signal DCS, a first output terminal connected to the oscillating path S2 and a second output terminal connected to an input terminal of a next demultiplexer. The last demultiplexer (not illustrated) has a second output terminal connected to the pass gate 724. The pass gate 724 has control terminals connected to the inverter 724. The demultiplexers 721, 722 ... forms a delay chain, and one or some of the demultiplexers 721, 722 ... according to the delay control signal DCS and the inverter 723 form a ring oscillator. The frequency of the oscillating output signal OUT is varied according to a number of the demultiplexers included in the ring oscillator in the second operation mode.

Figure 18:
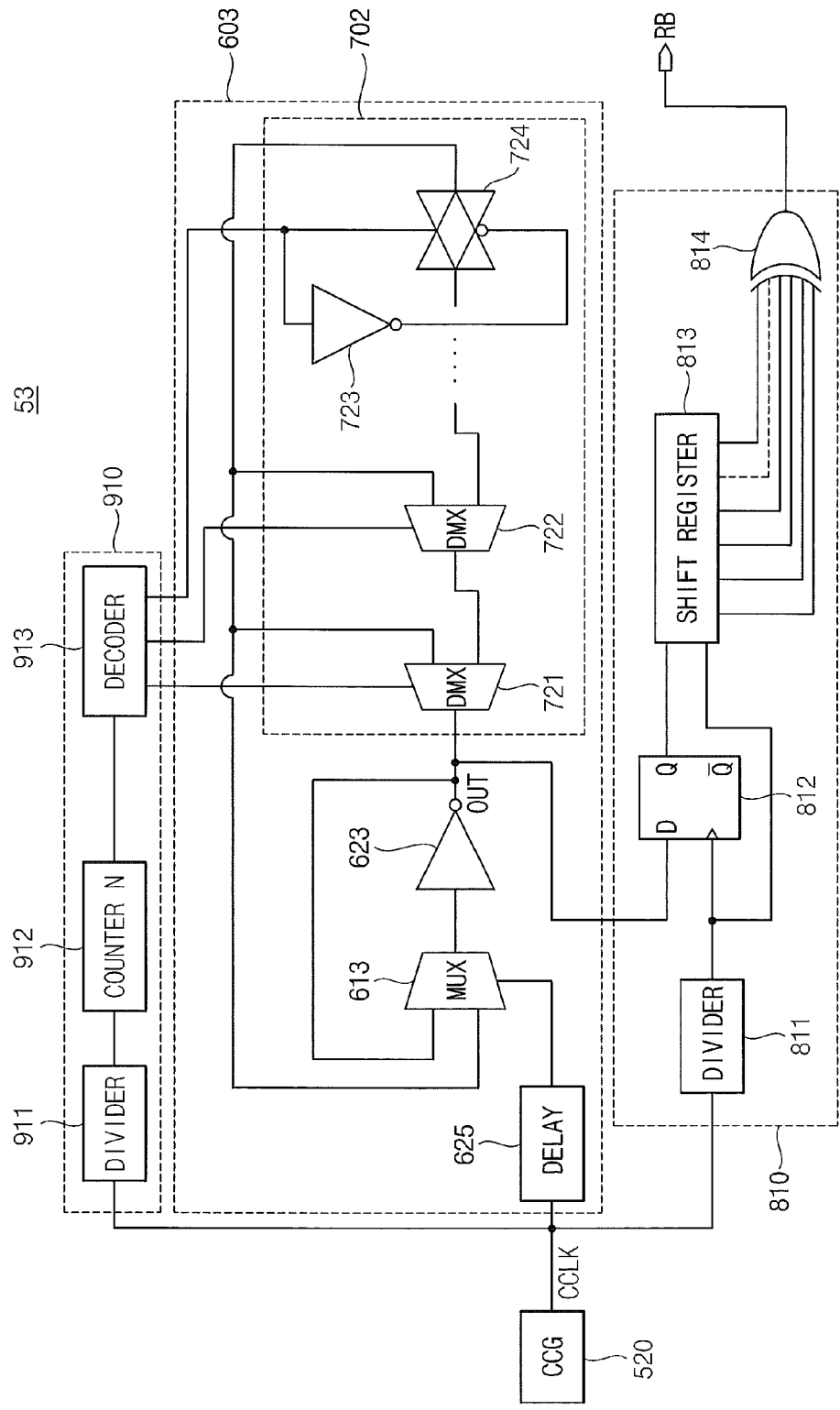
FIG. 18 is a circuit diagram illustrating an example of the random number generator of FIG. 14 according to still other example embodiments.

FIG. 18 is a circuit diagram illustrating an example of the random number generator of FIG. 14 according to still other example embodiments. Referring to FIG. 18, a random number generator 53 includes a control clock generator 520, an output signal providing unit 603, a sampling unit 810 and a delay control unit 910.

The random number generator 53 of FIG. 18 differs from the random number generator 52 of FIG. 17 in that the output signal providing unit 603, the sampling unit 810 and the delay control unit 910 have different structures from each of corresponding components in the random number generator 52.

The output signal providing unit 603 further includes a delay 325 which delays the control clock signal CCLK to be provided as a control signal to a multiplexer 613 compared to the output signal providing unit 602 in FIG. 17.

The sampling unit 810 includes a divider 811, a D flip-flop 812, a shift register 813 and an exclusive OR gate 814.

The divider 811 divides the control clock signal CCLK with a division ratio of two to provide the divided control clock signal to the D flip-flop 812. The D flip-flop 812 samples the oscillating output signal OUT and provides the sampled output signal to the shift register 813 in synchronization with the divided control clock signal. The shift register 813 sequentially stores and output the sampled output signal, the output of the D flip-flop, in response to the divided control clock signal. The exclusive OR gate performs an OR operation on outputs of the shift register 813 to provide the random bit RB. When the exclusive OR gate performs the OR operation on the outputs of the shift register 813 a sampling probability in the transition process section increases.

The delay control unit 910 includes a divider 911, a counter 912 and a decoder 913.

The divider 911 divides the control clock signal CCLK with a division ratio of two to output a divided control clock signal. The counter 912 counts the divided control clock signal. The decoder decodes an output of the counter 912 to provide the delay control signal DCS to the demultiplexers 721, 722, and so on. Each input terminal of the demultiplexers 721, 722, and so on is connected one of the first (upper) and second (lower) output terminals. For example, when the input terminal of the demultiplexer 721 is connected to the first output terminal of the demultiplexer 721, the demultiplexer 721 is included in the ring oscillator in the second operation mode. For example, when the input terminal of the demultiplexer 721 is connected to the second output terminal of the demultiplexer 721 and the input terminal of the demultiplexer 722 is connected to the first output terminal of the demultiplexer 722, the demultiplexers 721 and 722 are included in the ring oscillator in the second operation mode.

Figure 19:
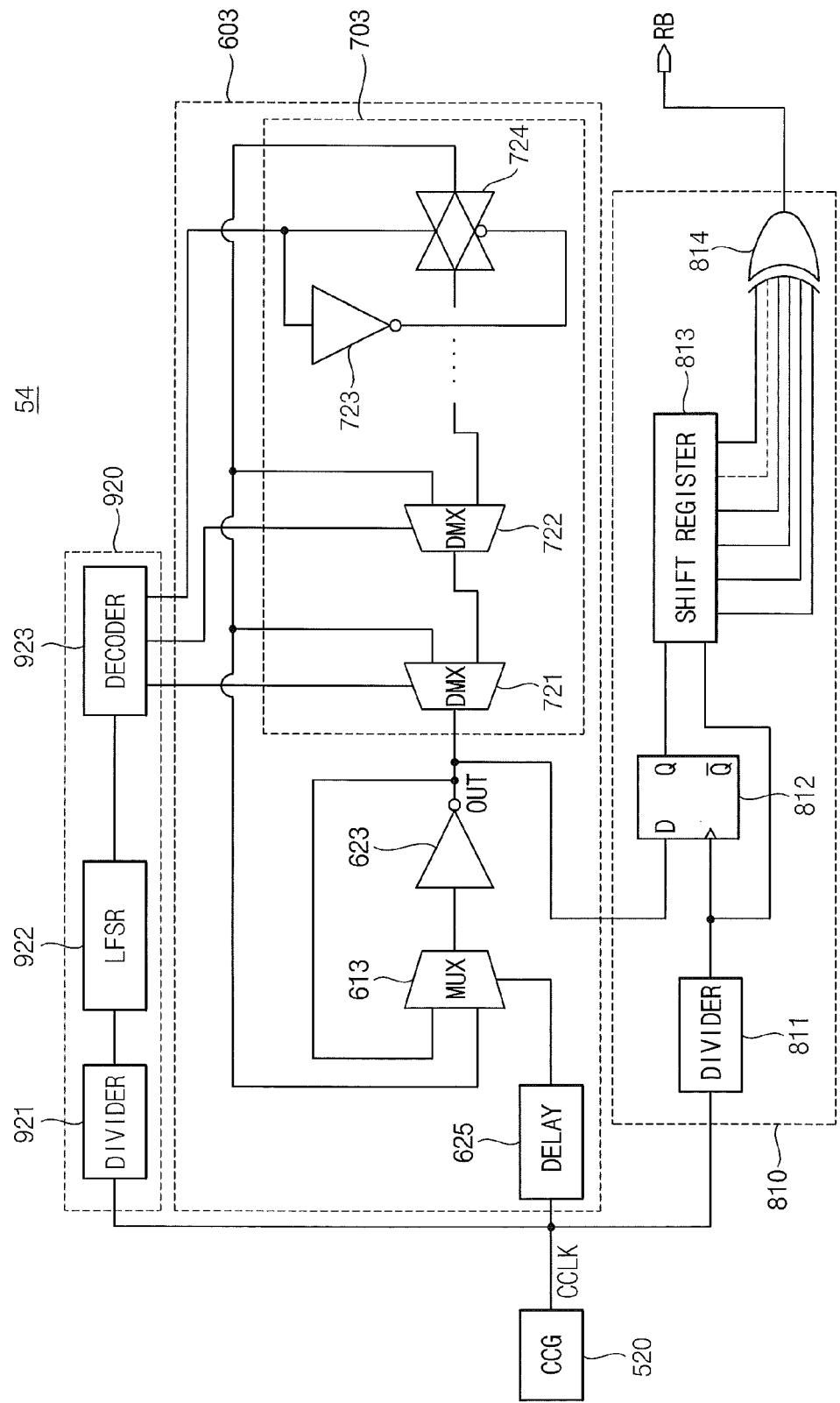
FIG. 19 is a circuit diagram illustrating an example of the random number generator of FIG. 14 according to still other example embodiments.

FIG. 19 is a circuit diagram illustrating an example of the random number generator of FIG. 14 according to still other example embodiments. Referring to FIG. 19, a random number generator 54 includes a control clock generator 520, an output signal providing unit 603, a sampling unit 810 and a delay control unit 920. The random number generator 54 of FIG. 19 differs from the random number generator 53 of FIG. 18 in that the delay control unit 920 has different structure from the delay control unit 910 in FIG. 18.

The delay control unit 920 includes a divider 921, a linear feedback shift register (LFSR) 922 and a decoder 923.

The divider 921 divides the control clock signal CCLK with a division ratio of two to output a divided control clock signal. The linear feedback shift register 922 performs a linear feedback shifting operation on the divided control clock signal. The decoder decodes an output of the linear feedback shift register 922 to provide the delay control signal DCS to the demultiplexers 721, 722, and so on.

Figure 20:
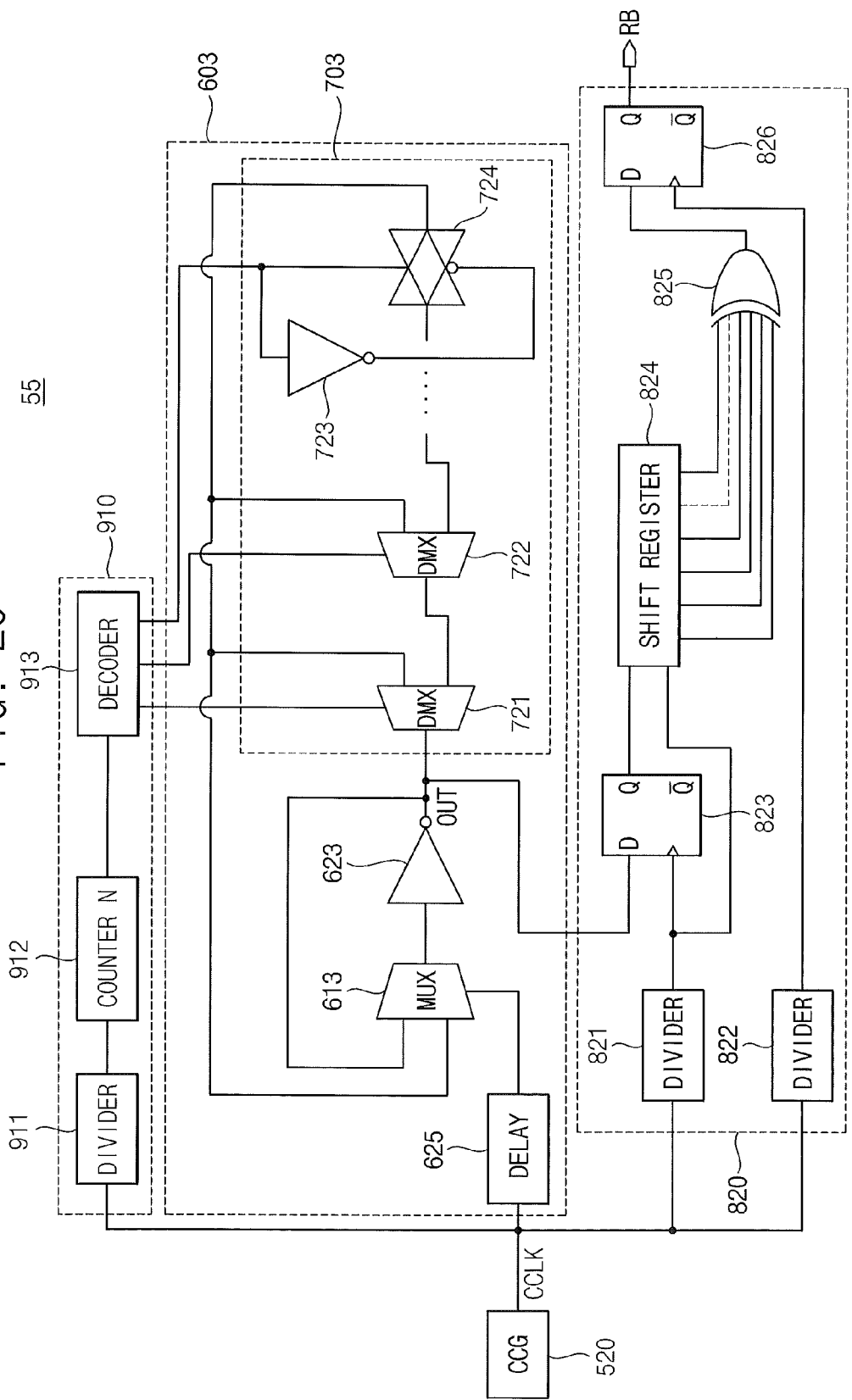
FIG. 20 is a circuit diagram illustrating an example of the random number generator of FIG. 14 according to still other example embodiments.

FIG. 20 is a circuit diagram illustrating an example of the random number generator of FIG. 14 according to still other example embodiments. Referring to FIG. 20, a random number generator 55 includes a control clock generator 520, an output signal providing unit 603, a sampling unit 820 and a delay control unit 910. The random number generator 55 of FIG. 20 differs from the random number generator 53 of FIG. 18 in that the sampling unit 820 has different structure from the sampling unit 810 in FIG. 18.

The sampling unit 820 includes dividers 821 and 822, a D flip-flop 823, a shift register 824, an exclusive OR gate 825 and a D flip-flop 826.

Each of the dividers 821 and 822 divides the control clock signal with a division ratio of two to provide a divided control clock signal. The D flip-flop 823 samples the oscillating output signal OUT to be provided to the shift register 824 in synchronization with the divided control signal from the divider 821. The shift register 824 sequentially stores and outputs the sampled output signal in response to the divided control signal from the divider 821. The exclusive OR gate 825 performs an exclusive OR operation on outputs of the shift register 824. The D flip-flop 826 samples an output of the exclusive OR gate 825 to provide the random bit RB in synchronization with the divided control clock signal from the divider 822.

In the random number generators detailed with reference to FIGS. 14, 15 and 18 through 20, the output signal providing unit (for example, 600 in FIG. 14) includes the switching element, the variable passive delay unit and only one active element (for example, 610 in FIG. 14) as the random number generators explained with reference to FIGS. 1 through 14. Therefore, each of the random number generators detailed with reference to FIGS. 14, 15 and 18 through 20 may provides the output signal OUT converging to the meta-stable state in the first operation mode, and may provide the oscillating output signal OUT in the second operation mode.

Figure 21:
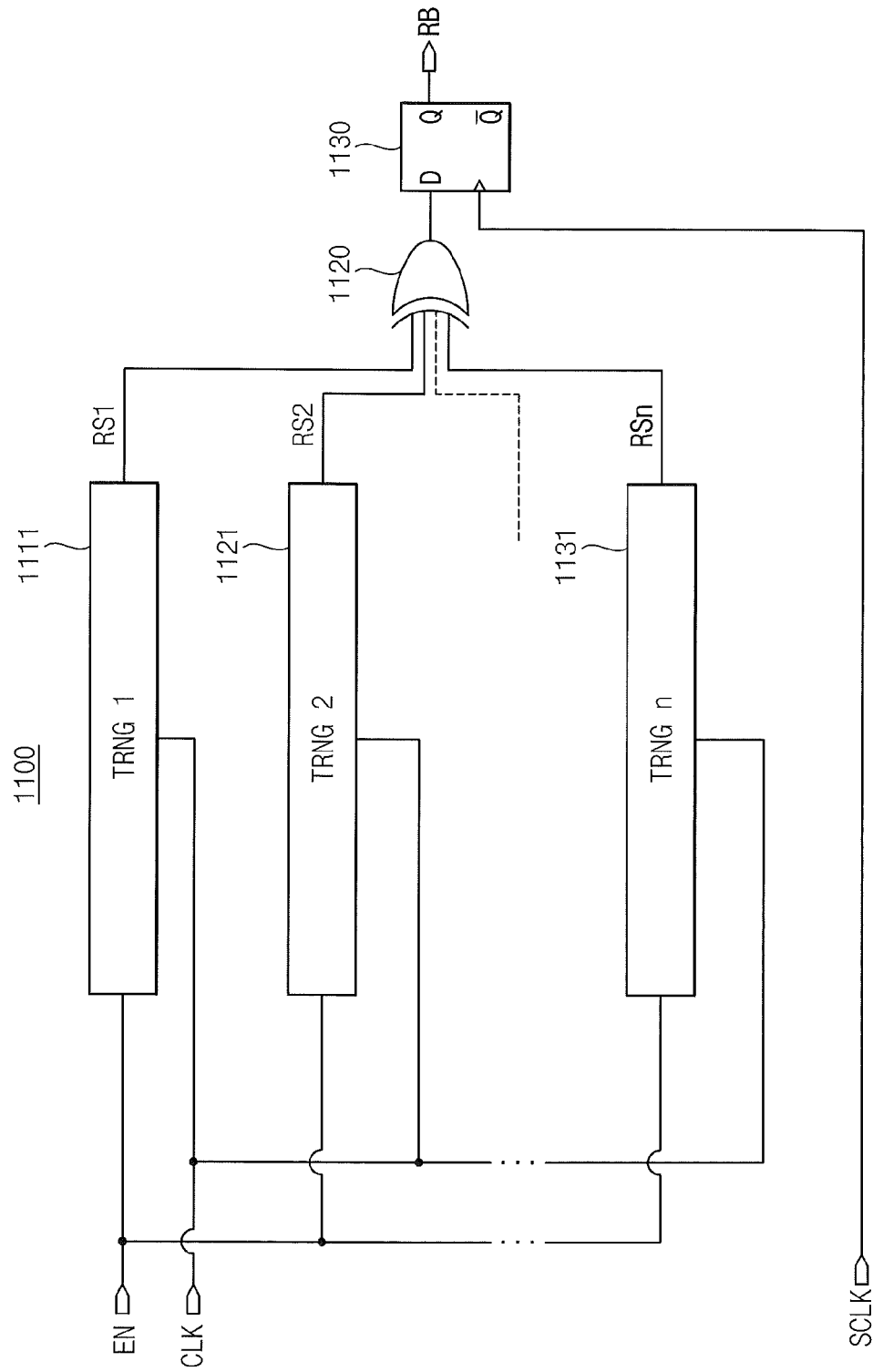
FIG. 21 is a block diagram illustrating a complex random number generator according to some example embodiments.

FIG. 21 is a block diagram illustrating a complex random number generator according to some example embodiments. Referring to FIG. 21, a complex random number generator 1100 includes a plurality of random number generating units (or random number generators) 1111, 1112 and 1113, an exclusive OR gate 1120 and a sampling unit 1130.

Each of the random number generating units 1111, 1112 and 1113 may be implemented with the random number generator 10 of FIG. 1 or the random number generator 50 of FIG. 14. Each of the random number generating units 1111, 1112 and 1113 may include one active element operating as an entropy source, and provides each of random signals RS1, RS2 and RSn in response to an enable signal EN and a clock signal CLK. The enable signal EN may be used for enabling each of the random number generating units 1111, 1112 and 1113 and the clock signal CLK may be used for sampling the oscillating output signal (Refer to FIG. 1) for generating the random signals RS1, RS2 and RSn. The sampling unit 1130, implemented with a D flip-flop, samples an output of the exclusive OR gate 1120 to provide a random bit RB in synchronization with a sampling clock signal SCLK. The exclusive OR gate 1120 performs an exclusive OR operation on the random signals RS1, RS2 and RSn. When the exclusive OR gate 1120 performs an exclusive OR operation on the random signals RS1, RS2 and RSn, the irregularity and unpredictability of the random bit RB may increase.

Figure 22:
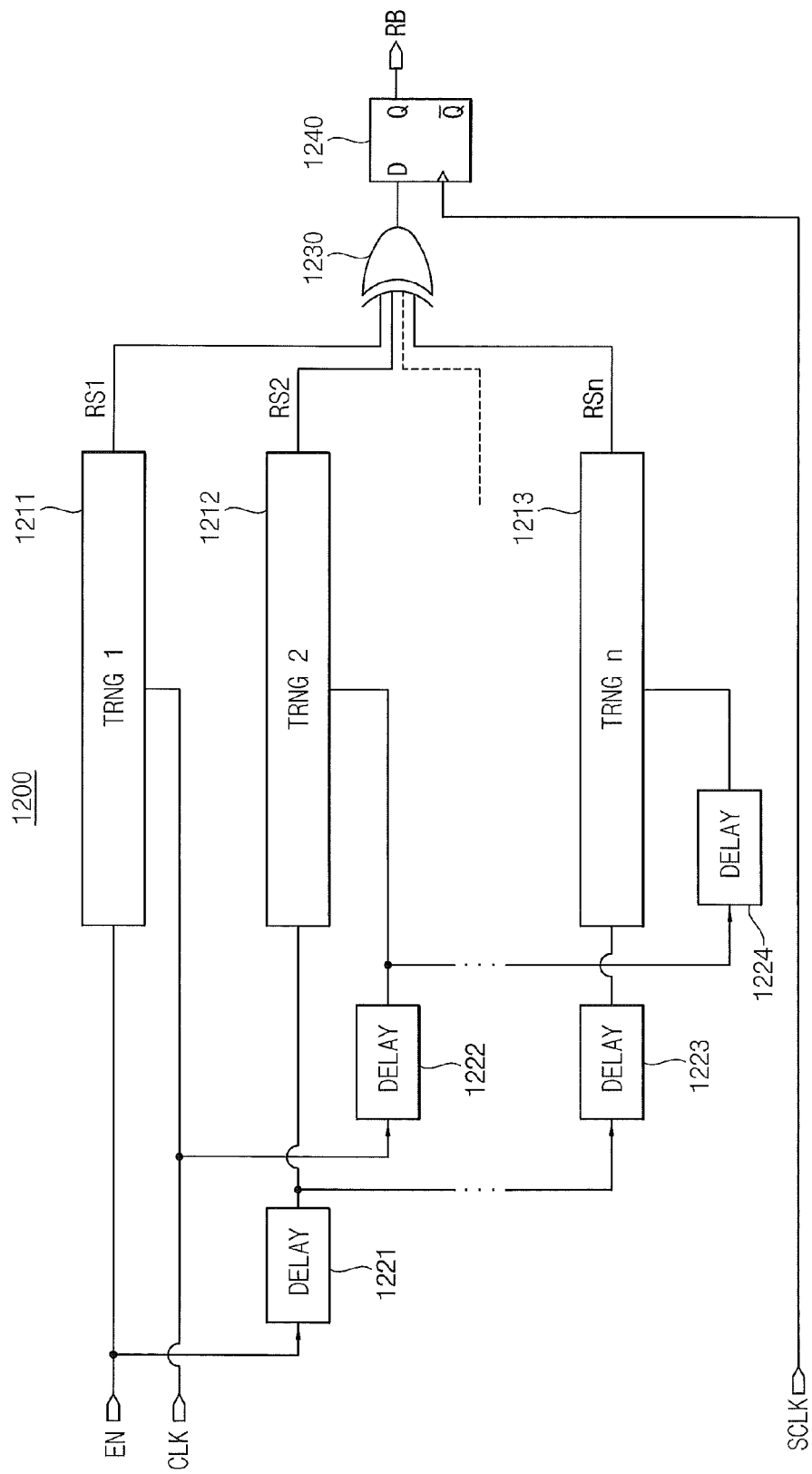
FIG. 22 is a block diagram illustrating a complex random number generator according to other example embodiments.

FIG. 22 is a block diagram illustrating a complex random number generator according to other example embodiments. Referring to FIG. 22, a complex random number generator 1200 includes a plurality of random number generating units 1211, 1212 and 1213, a plurality of delays 1221, 1222, 1223 and 1124, an exclusive OR gate 1230 and a sampling unit 1240.

Each of the random number generating units 1211, 1212 and 1213 may be implemented with the random number generator 10 of FIG. 1 or the random number generator 50 of FIG. 14. Each of the random number generating units 1211, 1212 and 1213 may include one active element operating as an entropy source, and provides each of random signals RS1, RS2 and RSn in response to the enable signal EN and the clock signal CLK. Each of the delays 1222 and 1224 delays the clock signal CLK with different delay times to provide delayed clock signal to each of the random number generating unit 1212 and 1213. In addition, each of the delays 1221 and 1223 delays the enable signal EN with different delays to provide delayed enable signals to each of the random number generating unit 1212 and 1213. Therefore, each of the random number generating units 1211, 1212 and 1213 may be enabled at different times. The exclusive OR gate 1230 performs an exclusive OR operation on the random signals RS1, RS2 and RSn. The sampling unit 1240, implemented with a D flip-flop, samples an output of the exclusive OR gate 1230 to provide a random bit RB in synchronization with the sampling clock signal SCLK. The complex random number generator 1200 may increase statistical stability and reduce power consumption by using the delays 1221, 1222, 1223 and 1224 thereby to adjust enabling timing and sampling timing of each of the random number generating units 1211, 1212 and 1213.

Figure 23:
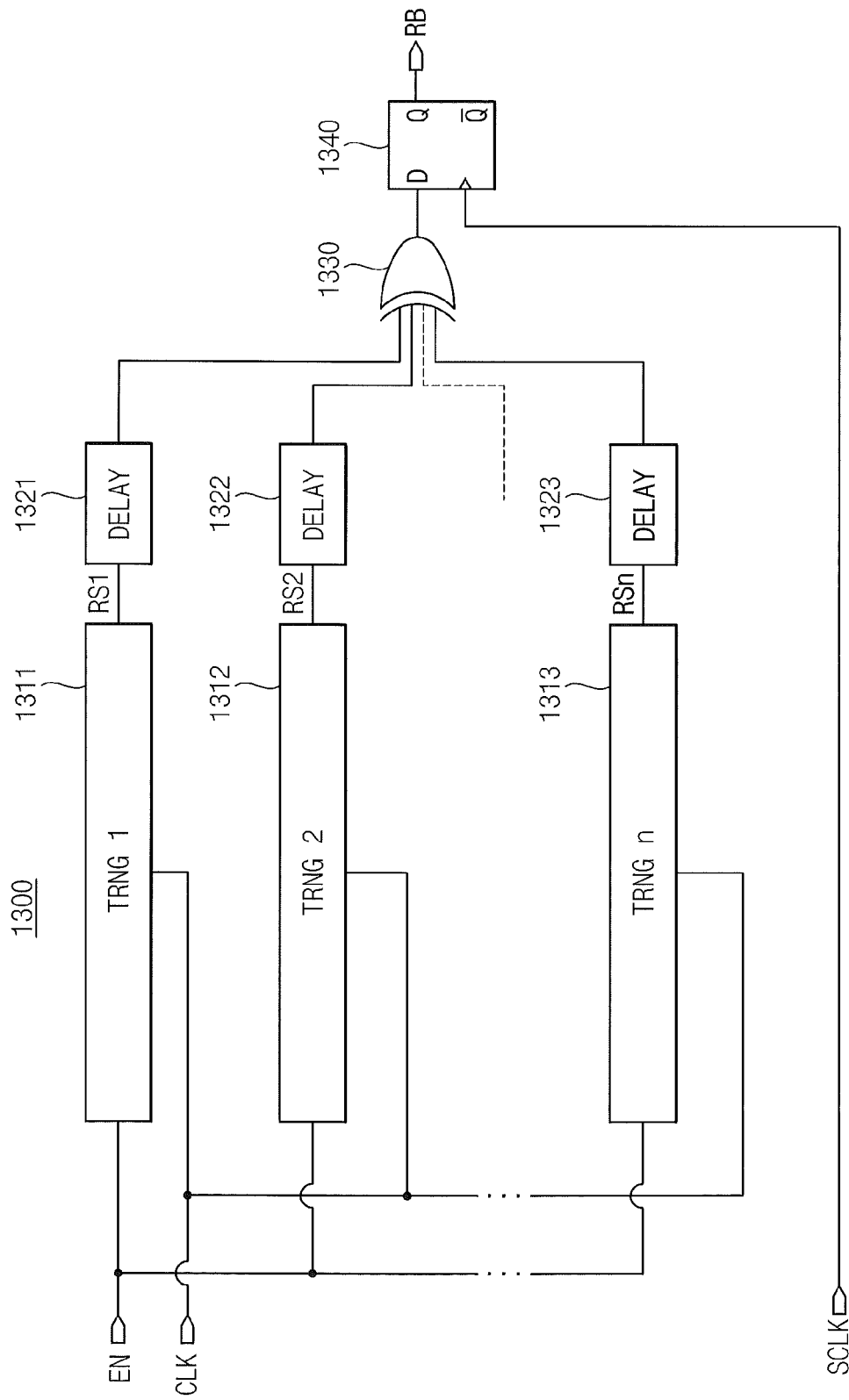
FIG. 23 is a block diagram illustrating a complex random number generator according to still other example embodiments.

FIG. 23 is a block diagram illustrating a complex random number generator according to still other example embodiments. Referring to FIG. 23, a complex random number generator 1300 includes a plurality of random number generating units 1311, 1312 and 1313, a plurality of delays 1321, 1322 and 1323, an exclusive OR gate 1330 and a sampling unit 1340.

Each of the random number generating units 1311, 1312 and 1313 may be implemented with the random number generator 10 of FIG. 1 or the random number generator 50 of FIG. 14. Each of the random number generating units 1311, 1312 and 1313 may include one active element operating as an entropy source, and provides each of random signals RS1, RS2 and RSn in response to the enable signal EN and the clock signal CLK. Each of the delays 1321, 1322 and 1323 delays each of the random signals RS1, RS2 and RSn with different delay times. The exclusive OR gate 1330 performs an exclusive OR operation on outputs of the delays 1321, 1322 and 1323. The sampling unit 1340 implemented with a D flip-flop samples an output of the exclusive OR gate 1330 to provide a random bit RB in synchronization with the sampling clock signal SCLK. The complex random number generator 1300 may increase statistical stability by using the delays 1321, 1322 and 1323 thereby to adjust applying timing of each of the random signals RS1, RS2 and RSn to the exclusive OR gate 1330.

Figure 24:
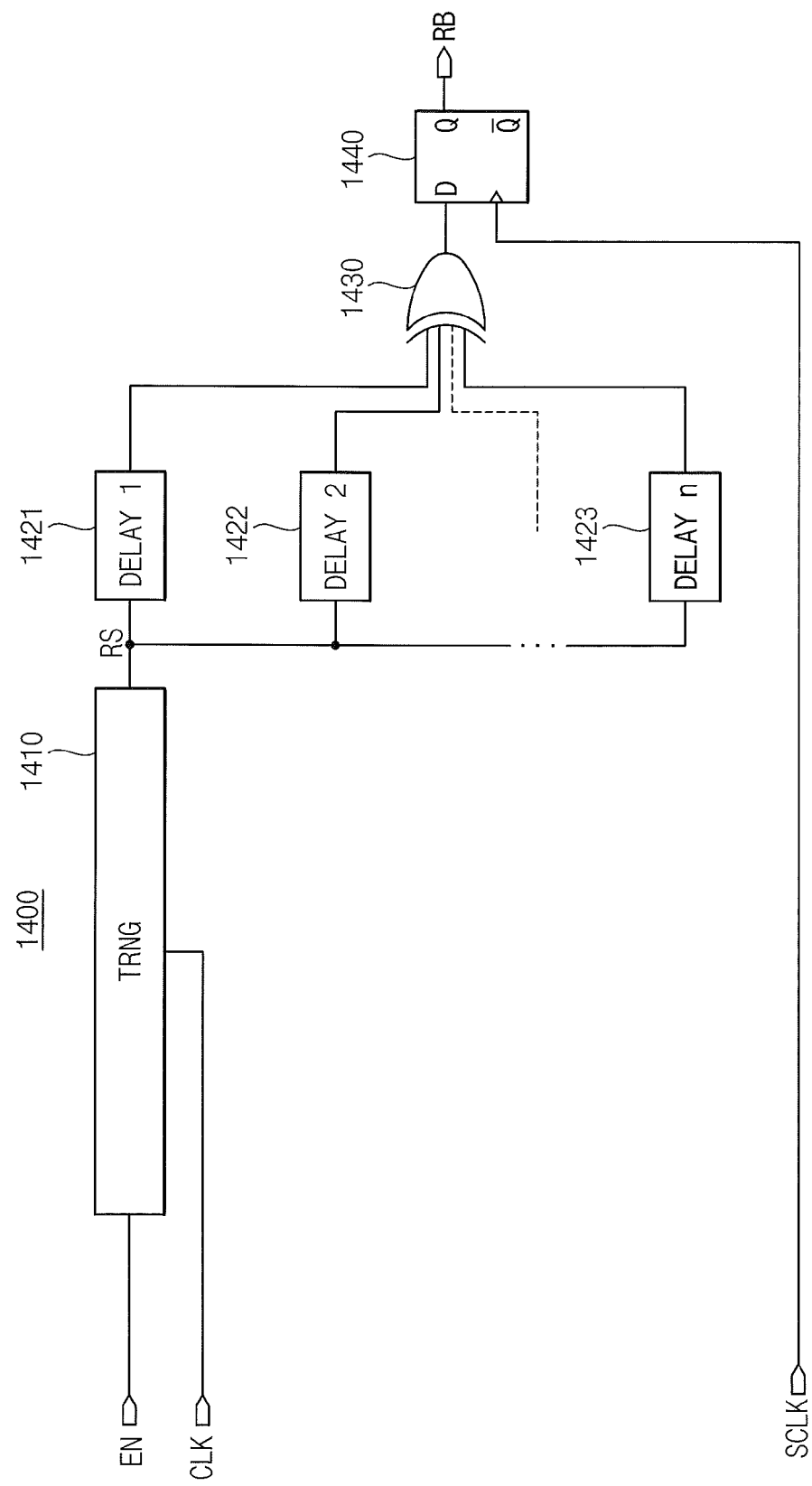
FIG. 24 is a block diagram illustrating a complex random number generator according to still other example embodiments.

FIG. 24 is a block diagram illustrating a complex random number generator according to still other example embodiments. Referring to FIG. 24, a complex random number generator 1400 includes a random number generating units 1410, a plurality of delays 1421, 1422 and 1423, an exclusive OR gate 1430 and a sampling unit 1440.

The random number generating unit 1410 may be implemented with the random number generator 10 of FIG. 1 or the random number generator 50 of FIG. 14. The random number generating unit 1410 may include one active element operating as an entropy source, and provides a random signal RS in response to the enable signal EN and the clock signal CLK.

Each of the delays 1421, 1422 and 1423 delays the random signal RS with different delay times. The exclusive OR gate 1430 performs an exclusive OR operation on outputs of the delays 1421, 1422 and 1423. The sampling unit 1440 implemented with a D flip-flop samples an output of the exclusive OR gate 1430 to provide a random bit RB in synchronization with the sampling clock signal SCLK. The complex random number generator 1400 may increase statistical stability and reduce power consumption by using the delays 1421, 1422 and 1423 thereby to adjust applying timing of the random signal RS to the exclusive OR gate 1430.

Figure 25:
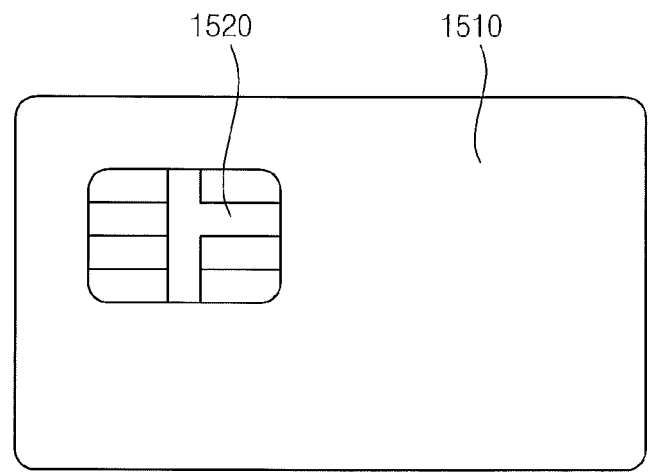
FIG. 25 illustrates an external view of an IC card according to some example embodiments.

FIG. 25 illustrates an external view of an IC card according to some example embodiments. The random number generators may be employed in an IC card of FIG. 25. Referring to FIG. 25, an IC card 1500 includes a card 1510 formed by a plastic case and an IC card chip formed by one-chip microcomputer or the like (not illustrated) mounted in the card 1510. The IC card 1500 also includes a plurality of contacts (electrodes) 1520 connected to an external terminal of the IC card chip 1500.

The plurality of contacts 1520 are a power terminal VCC, a power reference potential terminal VSS, a reset input terminal RES bar, a clock terminal CLK, and a data terminal DATA which will be described in detail with reference to FIG. 26. The IC card 1500 receives power from an externally connected device such as a reader/writer (not illustrated) via the contacts 1520 and performs data communication with the externally connected device.

Figure 26:
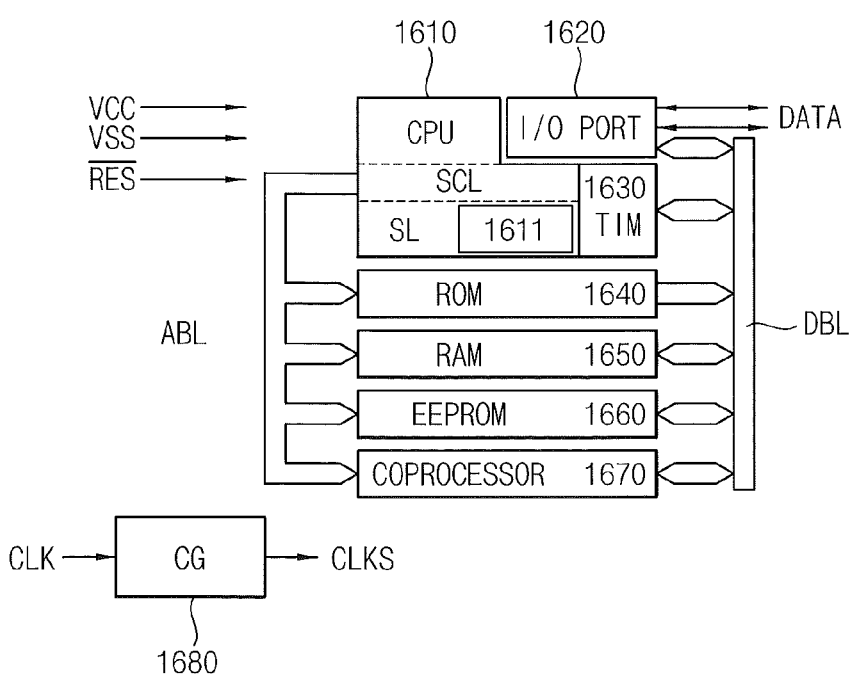
FIG. 26 is a block diagram illustrating the IC card chip (microcomputer) mounted on the IC card of FIG. 25 according to some example embodiments.

FIG. 26 is a block diagram illustrating the IC card chip (microcomputer) mounted on the IC card of FIG. 25 according to some example embodiments. The circuit blocks in FIG. 26 are formed on a single semiconductor substrate such as mono-crystal silicon. Referring to FIG. 26, the IC card chip 1600 includes a central processing unit (CPU) 1610, a ROM (Read Only Memory) 1640, a RAM (Random Access Memory) 1650, a nonvolatile memory (EEPROM) 1660, a coprocessor (encryption/decryption device) 1670 for performing encryption and decryption. A clock generator 1680 receives an external clock CLK supplied via the contacts 1520 in FIG. 25 from a reader/writer (externally connected device) (not illustrated), forms a system clock signal CLKS synchronized with the external clock signal CLK, and supplies the system clock signal CLKS inside the chip.

The CPU 1610 performs logic operation and arithmetic calculation and controls the system control logic SCL, the random number generator 1611, the security logic SL, and the timer 1630. The memories such as the RAM 1650, the ROM 1640, and the EEPROM 1660 store programs and data. The coprocessor 1670 is formed by a circuit compatible with the DES encryption method and the like. An I/O port 1620 performs communication with the reader/writer. The data bus DBL and the address bus ABL connect the respective components.

Figure 27:
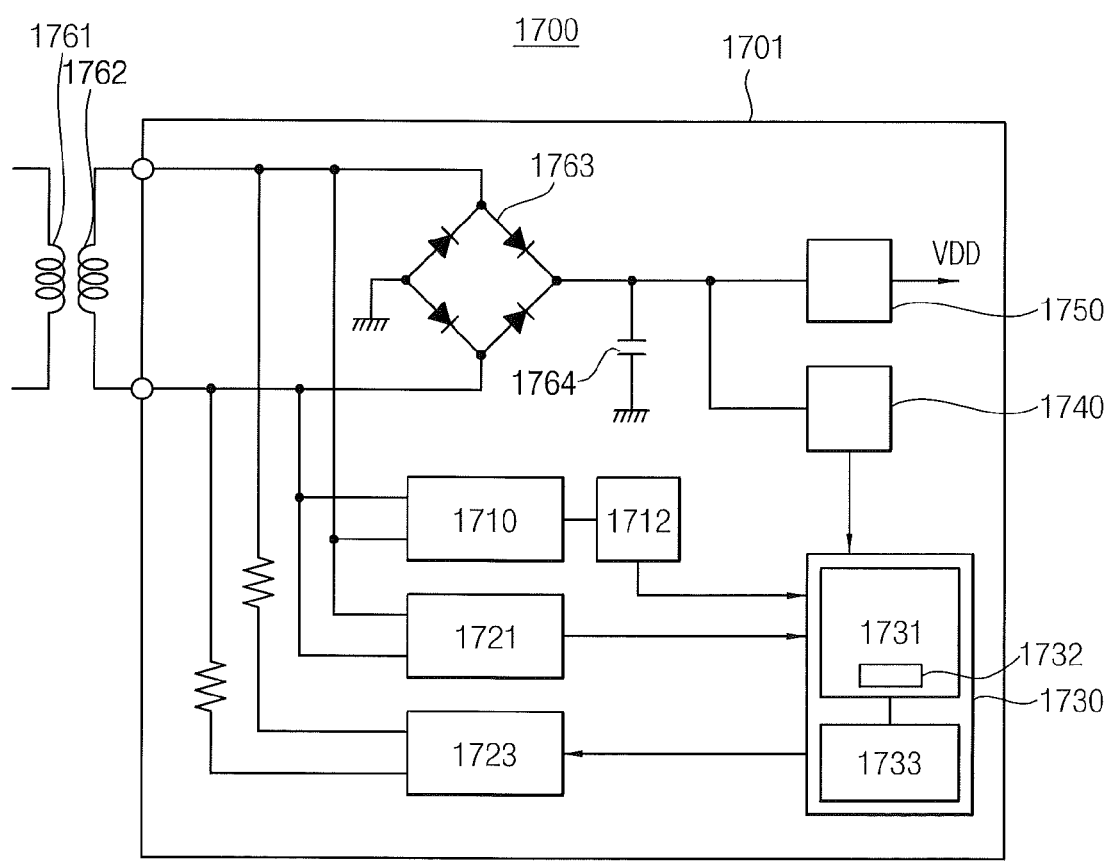
FIG. 27 is a block diagram illustrating a non-contact IC card according to some example embodiments.

FIG. 27 is a block diagram illustrating a non-contact IC card according to some example embodiments. FIG. 27 also illustrates a coil (antenna) 1761 of a reader/writer provided as an external device for the non-contact IC card. Referring to FIG. 27, a non-contact IC card 1700 may be, for example, a so-called adhesion type non-contact IC card including a coil-shaped electricity-receiving coil 1762 (card side antenna) formed on a card surface by using a copper foil, for example, and an LSI 1701 connected to the electricity-receiving coil 1761 via a predetermined wiring layer. The LSI 1701 is formed by a rectifier circuit 1763 including four diodes bridged, a smoothing capacitor 1764 for smoothing the rectified voltage of the rectifier circuit 1763, and a stabilizing power supply circuit 1750, which form an operation voltage VDD of an internal circuit 1730 including a logic circuit 1731 and a nonvolatile memory 1731. For the rectifier circuit 1763, a clock generating circuit 1710, a data receiving circuit 1721, and a data transmitting circuit 1723 are provided substantially in a parallel form.

The rectifier circuit 1762 formed by the diode bridge circuit rectifies an AC signal, i.e., a carrier transmitted as power to the electricity receiving coil 1762 of the non-contact IC card 1700 by the electromagnetic coupling with a transmission coil 1761 (antenna) of the reader/writer, generates DC power voltage VDD from voltage smoothed by the smoothing capacitor 1764 by the stabilizing power supply, and supplies the DC power voltage VDD as power to the respective function blocks of the LSI 1701. A power-ON reset circuit 1740 detects a rise of the power voltage VDD, i.e., detects the connection with the reader/writer and resets the logic circuit register and latch circuit so as to normally perform data reception and transmission.

The data receiving circuit 1721 receives and demodulates data transmitted, for example, by frequency-modulating the carrier and transmits it as internal input data to the internal circuit of the LSI 1701. The output data formed in the internal circuit 1730 frequency-modulates the carrier by the data transmission circuit 1723 and transmits it to the reader/writer.

The aforementioned internal circuit (logic circuit 1731), the data receiving circuit 1721, and the data transmitting circuit 1723 requires a clock signal for the operation sequence control and signal reception and transmission in addition to the aforementioned operation voltage VDD. In this embodiment, the clock generating circuit 1710 generates a clock signal by using the AC signal as a pulse signal. The logic circuit 1731 includes a random number generator 1732, which is used for data transmission and reception to/from outside.

In the aforementioned non-contact IC card 1700, the DC power voltage VDD has a small current supply capacity and the power consumption by the random number generator 1732 also should be small. The random number generator 1732 successively operates the unit circuits and power consumption can be made small.

As mentioned above, the random number generator according to example embodiments may reduce influences of the mismatch due to process variations, may increase through-output and may reduce power consumption by including one active element operating as an entropy source. Therefore, the random number generator according to example embodiments may be widely employed in mobile devices and hand-held devices for increasing security of the devices. For example, the random number generator 10, 12 of FIGS. 1, 3, 5 and 6 can include a signal generator 200, which is responsive to a first clock signal CCLK1. The signal generator 200, 202 is configured to generate an oscillating signal (see, e.g., "Gener." of FIG. 5 and FIG. 6) having a peak-to-peak voltage that varies as a function of time during at least a portion of a second half-period of the first clock signal CCLK1 (e.g., time interval t1, t2 when CCLK1=1). The signal generator 200, 202 is also configured to generate a metastable seed signal (MS) during a first half-period of the first clock signal (e.g., when CCLK1=0). This metastable seed signal MS (see, e.g., 31, 32 in FIG. 6) has a voltage that designates a starting value of the oscillating signal during the second half-period of the first clock signal (i.e., when CCLK1 switches from 0 to 1 at the end of t0). (See, also, FIG. 16)

The random number generator 10, 12 further includes a sampling unit (SU 400 in FIG. 1 and D-type flip-flop 410 in FIG. 3), which is configured to detect a logic value of the oscillating signal in-sync with a second clock signal CCLK2 that is out-of-phase relative to the first clock signal CCLK1. In particular, the sampling unit 400, 410 may include a latch (e.g., D-type flip-flop) having a data input responsive to the oscillating signal (at output OUT) and a sync input responsive to the second clock signal CCLK1. The random number generator 10, 12 may also include a first delay unit 120, which is configured to generate the second clock signal CCLK2 in response to the first clock signal CCLK1.

The signal generator 200, 202 may operate as a ring oscillator during the second half-period (see, e.g., time interval t1, t2 in FIG. 6) of the first clock signal CCLK1. In addition, the signal generator may be configured to generate the metastable seed signal MS using an inverting logic circuit (e.g., inverter 221) having an input and an output electrically connected together. The signal generator may also include a second delay unit (e.g., passive delay unit 300, 301), which has an input electrically coupled to the output of the inverting logic circuit, and a switching device (e.g., MUX 212) having a first input S2 electrically coupled to an output of the second delay unit 301 and a second input S1 electrically coupled to the output of the inverting logic circuit 221. In some of these embodiments of the invention, the inverting logic circuit may be configured as a conventional inverter 221 and the switching device may be configured as a multiplexer 212 having a control terminal responsive to the first clock signal CCLK1.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A random number generator, comprising:
    a signal generator responsive to a first clock signal, said signal generator configured to generate a metastable seed signal during a first half-period of the first clock signal and further configured to generate an oscillating signal having a peak-to-peak voltage that varies as a function of time during at least a portion of a second half-period of the first clock signal, said metastable seed signal having a voltage that designates a starting value of the oscillating signal during the second half-period of the first clock signal.

2. The generator of claim 1, further comprising:
    a sampling unit configured to detect a logic value of the oscillating signal in-sync with a second clock signal that is out-of-phase relative to the first clock signal.

3. The generator of claim 2, wherein said sampling unit comprises a latch having a data input responsive to the oscillating signal and a sync input responsive to the second clock signal.

4. The generator of claim 3, further comprising a first delay unit configured to generate the second clock signal in response to the first clock signal.

5. The generator of claim 1, wherein said signal generator operates as a ring oscillator during the second half-period of the first clock signal.

6. The generator of claim 1, wherein said signal generator is configured to generate the metastable seed signal using an inverting logic circuit having an input and an output electrically connected together.

7. The generator of claim 6, wherein said signal generator comprises:
    a second delay unit having an input electrically coupled to the output of the inverting logic circuit; and
    a switching device having a first input electrically coupled to an output of said second delay unit and a second input electrically coupled to the output of the inverting logic circuit.

8. The generator of claim 7, wherein said inverting logic circuit is an inverter; and wherein said switching device is a multiplexer having a control terminal responsive to the first clock signal.

9. A random number generator, comprising:
    a signal generator configured to generate an alternating sequence of metastable seed signals and oscillating signals during respective first and second half-periods of a clock signal, said oscillating signals having respective phases determined by corresponding ones of the metastable seed signals in the alternating sequence; and
    a sampling unit configured to detect a logic value of each consecutive oscillating signal during a portion of a respective half-period of the clock signal.

10. The generator of claim 9, wherein said signal generator is responsive to the clock signal; and wherein said sampling unit is responsive to a delayed version of the clock signal.

11. A random number generator, comprising:
    an output signal providing unit including an active element which operates as an entropy source, configured to provide an output signal converging to a meta-stable state in a first logic level of a first control clock signal and configured to provide an oscillating output signal in a second logic level of the first control clock signal;
    a sampling unit configured to sample the oscillating output signal to output a random bit in synchronization with a second control clock signal; and
    a control clock generating unit configured to generate the first and second control clock signals.

12. The random number generator of claim 11, wherein the output signal providing unit further includes:
    a switching device which selectively connects an input of the active element to a converging path or an oscillating path based on the first control clock signal; and
    a passive delay unit, connected to an output of the active element, which includes a plurality of passive delay elements cascaded-connected with respect to one another.

13. The random number generator of claim 12, wherein the switching device is selectively connected such that the active element forms a feedback loop to provide the output signal converging to the meta-stable state in the first logic level of the first control clock signal, and the active element and the passive delay unit forms a ring oscillator to provide the oscillating output signal in the second logic level of the first control.

14. The random number generator of claim 12, wherein the active element includes one of an inverter, a NAND gate and a NOR gate.

15. The random number generator of claim 12, wherein the switching device includes a three-terminal switch or a multiplexer which has a control terminal receiving the first control clock signal.

16. The random number generator of claim 12, wherein each of the passive delay elements includes:

a first metal oxide semiconductor (MOS) capacitor connected to a power supply voltage; and a second MOS capacitor connected to a ground voltage, wherein the second MOS capacitor is connected to the first MOS capacitor at a connection node.

17. The random number generator of claim 16, wherein each of the passive delay elements further includes a transmission gate connected to the first and second MOS capacitors at the connected node.

18. The random number generator of claim 16, wherein each of the passive delay elements further includes a multiplexer connected to the first and second MOS capacitors at the connected node, and wherein the multiplexer has two input terminals receiving a same input signal.

19. The random number generator of claim 12, wherein each of the passive delay elements includes a multiplexer having two input terminals receiving a same input signal.

20. The random number generator of claim 11, wherein the control clock generating unit includes:

a clock generator which generates the first control clock signal; and a delay element which delays the first control clock signal to provide the second control clock signal.

\* \* \* \* \*